United States Patent [19]
Krueger et al.

[11] Patent Number: 5,258,416
[45] Date of Patent: Nov. 2, 1993

[54] RIGID POLYURETHANE FOAMS CONTAINING LITHIUM SALTS FOR ENERGY ABSORBING APPLICATIONS

[75] Inventors: David C. Krueger; Donald L. Christman, both of Grosse Ile; Andreas H. Rothacker, Dearborn Heights; Thomas B. Lee, Southgate, all of Mich.

[73] Assignee: BASF Corporation, Parsippany, N.J.

[21] Appl. No.: 8,379

[22] Filed: Jan. 25, 1993

Related U.S. Application Data

[62] Division of Ser. No. 850,542, Mar. 13, 1992.

[51] Int. Cl.⁵ ............................................. C08J 9/02
[52] U.S. Cl. ........................................ 521/125; 521/130
[58] Field of Search .................................. 521/125, 130

[56] References Cited

U.S. PATENT DOCUMENTS

| | | |
|---|---|---|
| 3,041,295 | 6/1962 | Wiech et al. |
| 3,108,975 | 10/1963 | Lambert et al. |
| 3,634,345 | 1/1972 | Diehr et al. |
| 3,769,245 | 10/1973 | Stewart et al. |
| 3,933,692 | 1/1976 | Kushefsky et al. ............ 521/52 |
| 3,940,517 | 2/1976 | Deleon . |
| 4,031,049 | 6/1977 | Hirosawa et al. ............ 521/163 |
| 4,107,069 | 8/1978 | Keller et al. |
| 4,116,893 | 9/1978 | Flanagan . |
| 4,190,712 | 2/1980 | Flanagan . |
| 4,212,954 | 7/1980 | Nomura et al. |
| 4,256,847 | 3/1981 | Spector . |
| 4,282,330 | 8/1981 | Austin . |
| 4,559,370 | 12/1985 | Blampied ............ 521/112 |
| 4,585,803 | 4/1986 | Nelson et al. ............ 521/105 |
| 4,585,807 | 4/1986 | Christman . |
| 4,604,410 | 8/1986 | Altenberg ............ 521/173 |
| 4,614,754 | 9/1986 | Christman . |
| 4,664,563 | 5/1987 | Christman . |
| 4,696,954 | 9/1987 | Pritchard et al. |
| 4,722,946 | 2/1988 | Hostettler . |
| 4,758,604 | 7/1988 | Barron ............ 521/125 |
| 4,758,604 | 7/1988 | Barron . |
| 4,866,102 | 9/1989 | Pray et al. |
| 4,895,879 | 1/1990 | Nelson et al. ............ 521/106 |
| 5,084,485 | 1/1992 | Heilig et al. |

OTHER PUBLICATIONS

Thompson-Colon, James A., et al., "Fundamental Studies of Polyurethane Foam for Energy Absorption in Automotive Interiors", SAE Technical Paper Series, 910404.

*Primary Examiner*—Morton Foelak
*Attorney, Agent, or Firm*—Dennis V. Carmen

[57] ABSTRACT

The present invention relates to using lithium salts of an organic material having 2 to 30 carbon atoms and at least one carboxylic acid in a rigid polyurethane formulation to produce foams having energy absorbing properties.

26 Claims, 10 Drawing Sheets

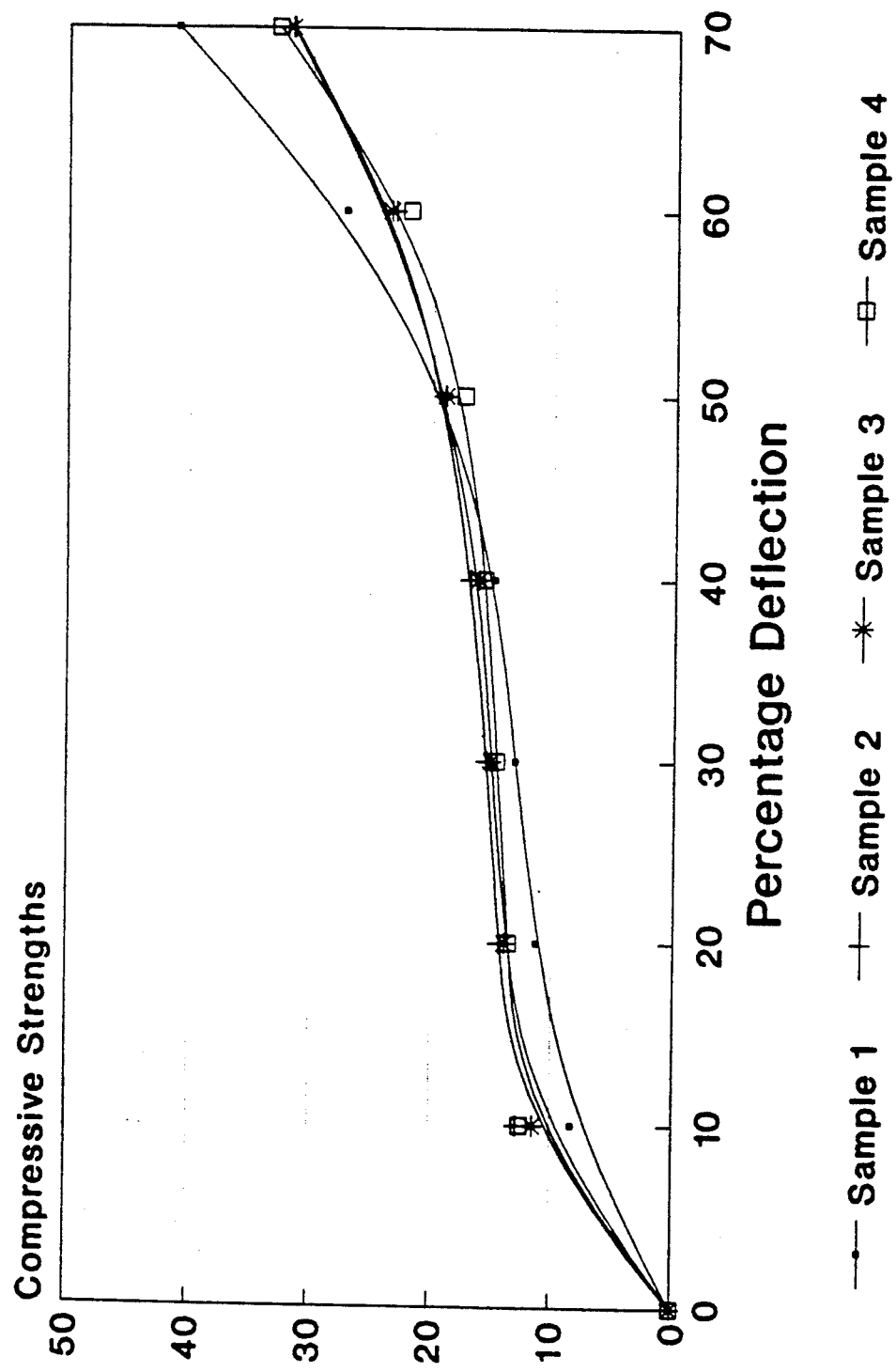

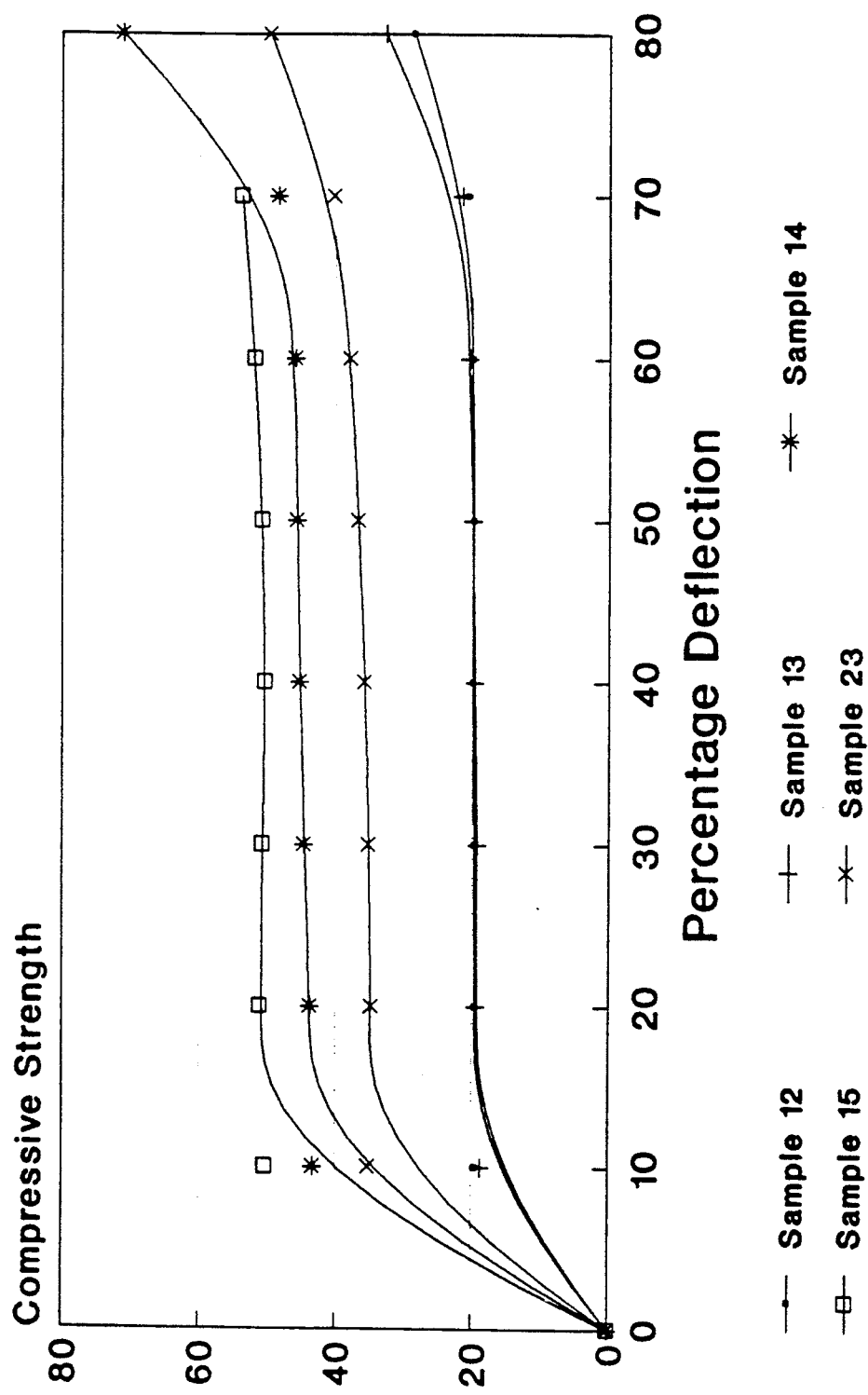

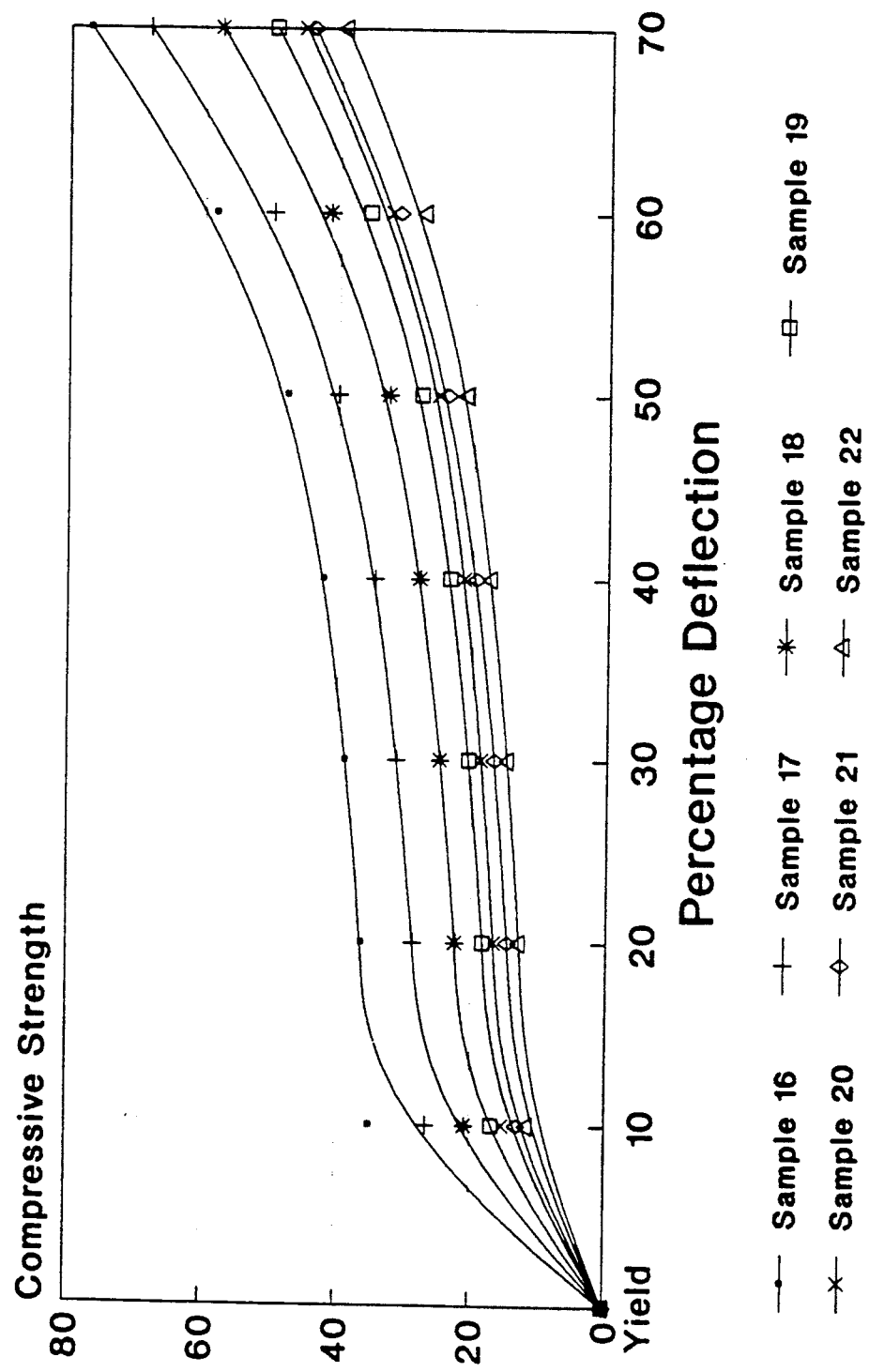

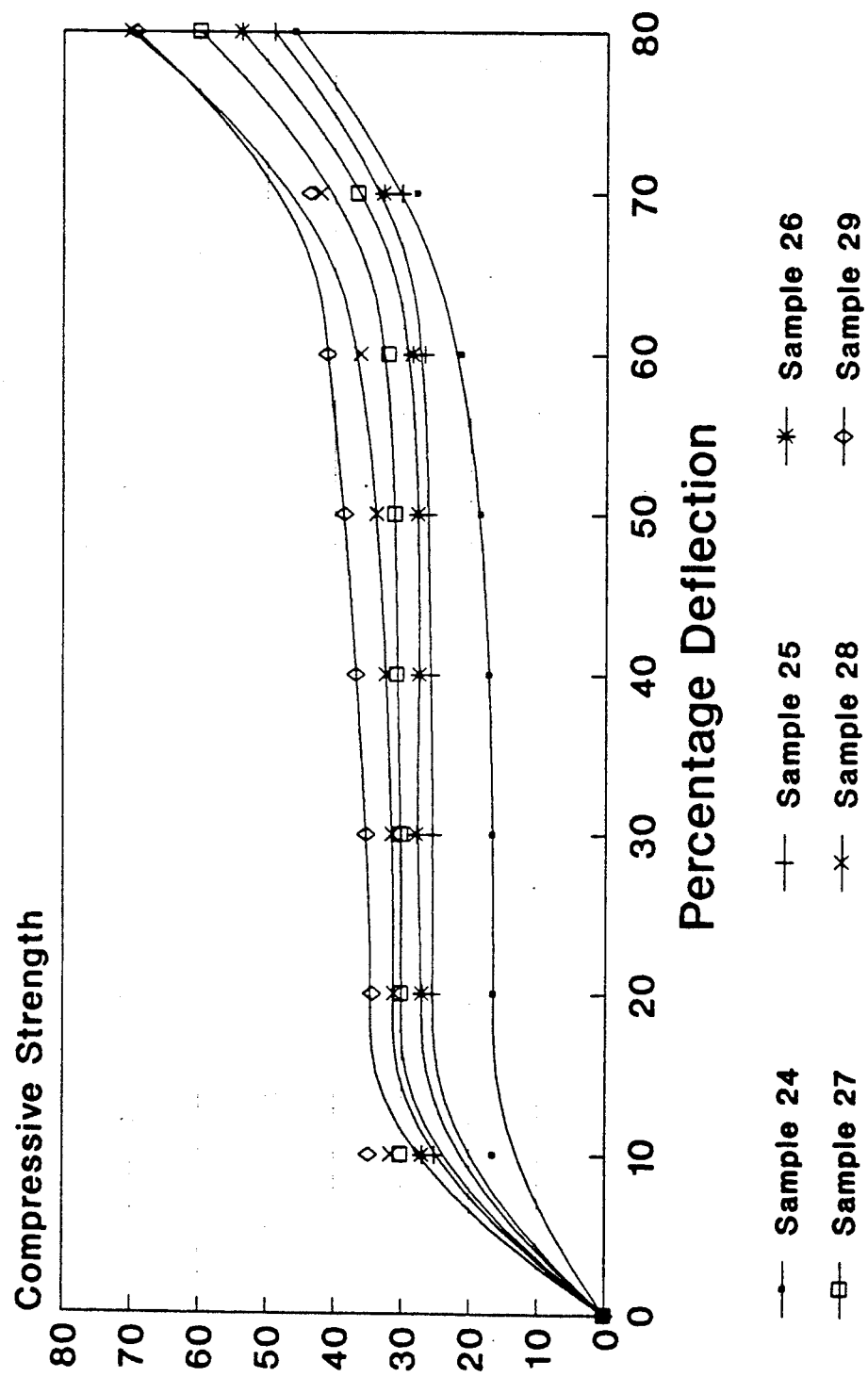

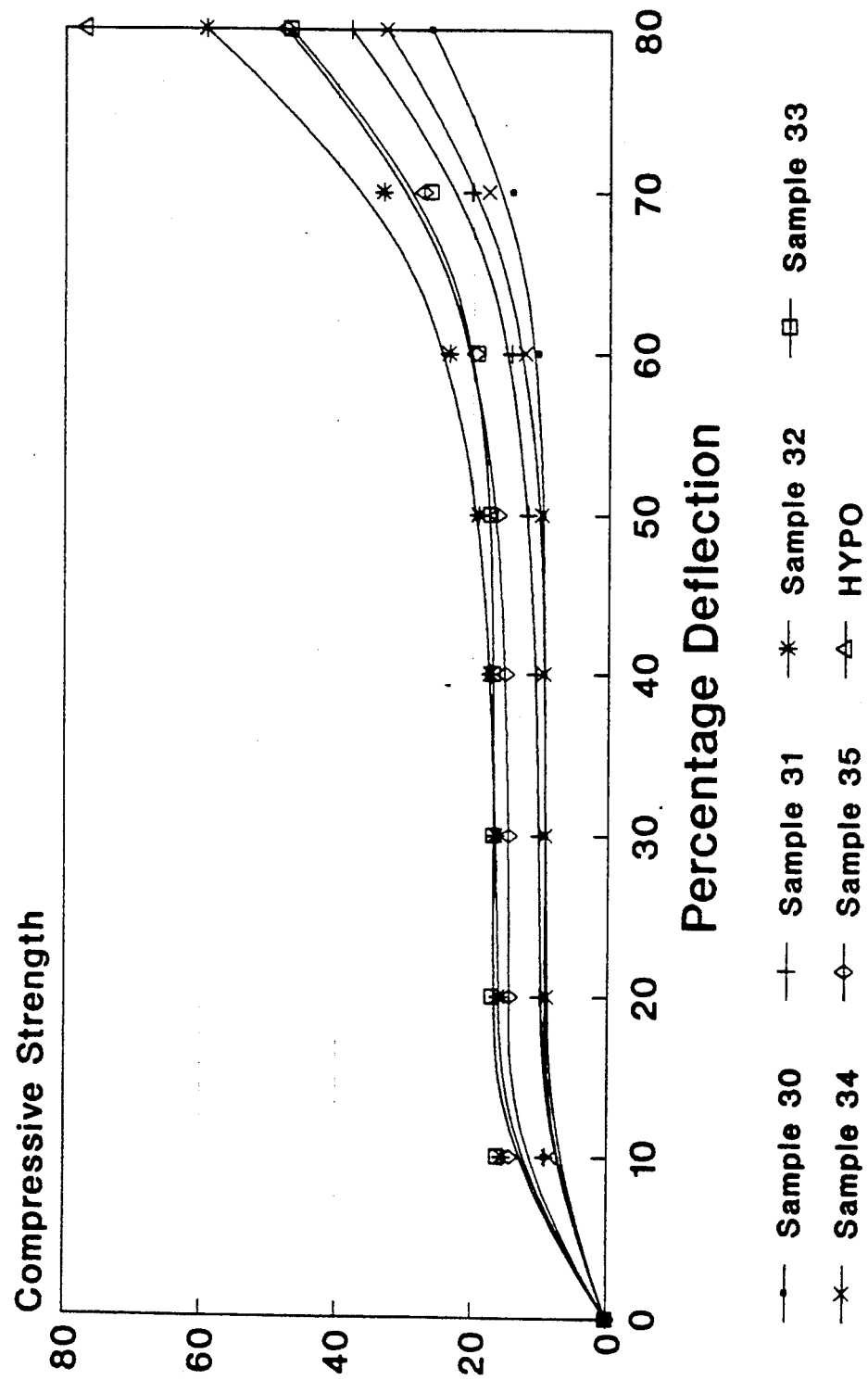

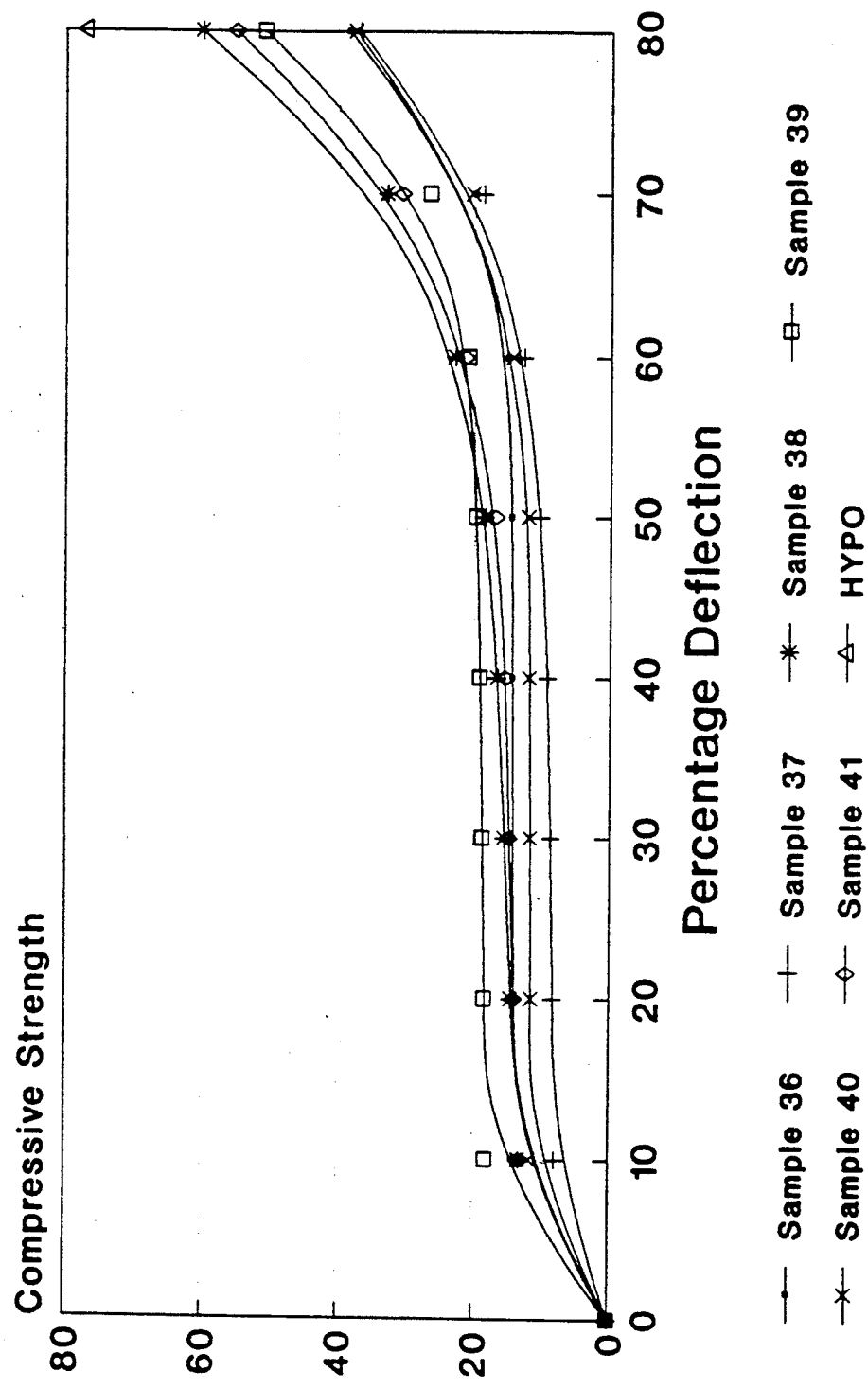

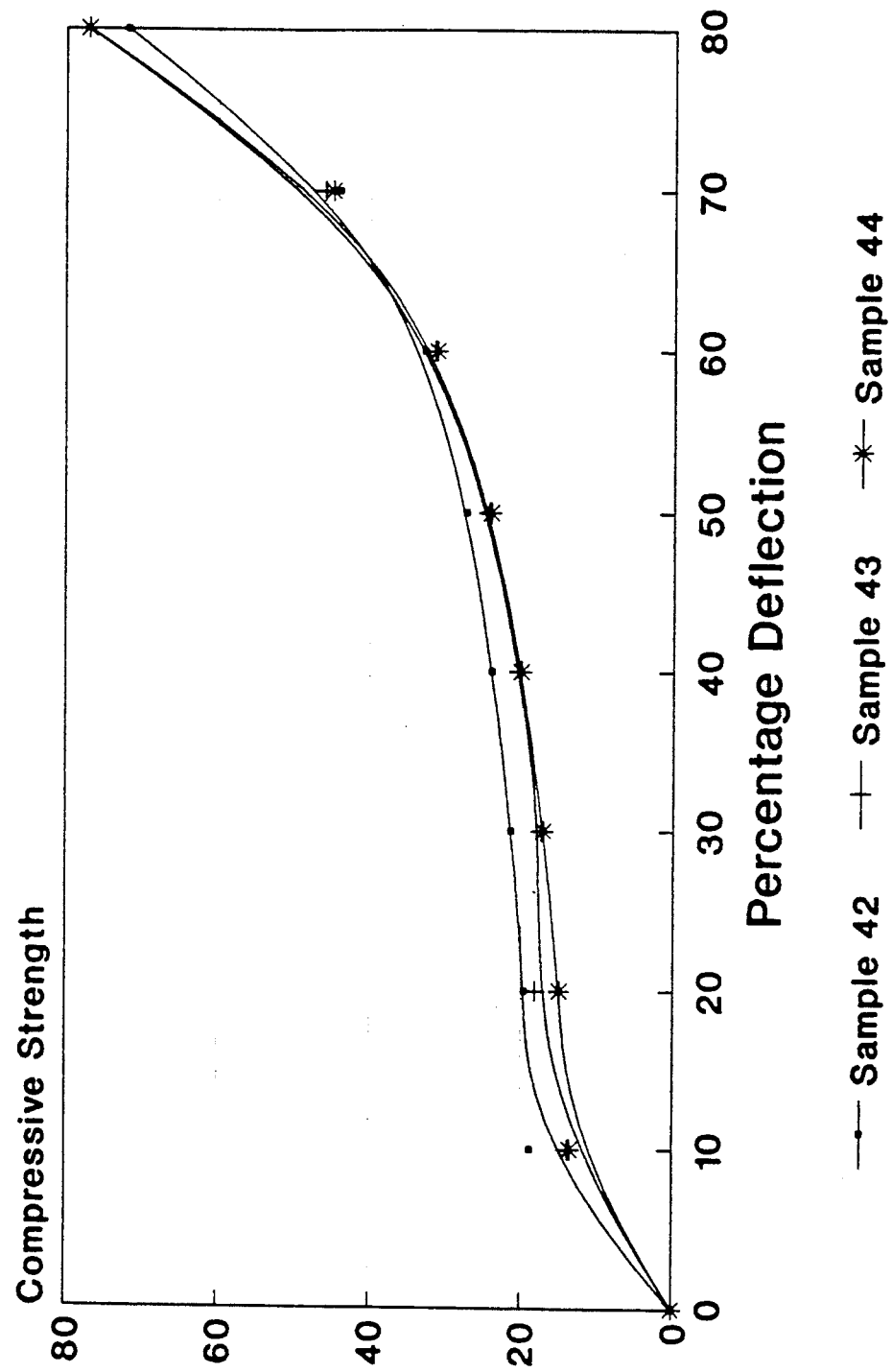

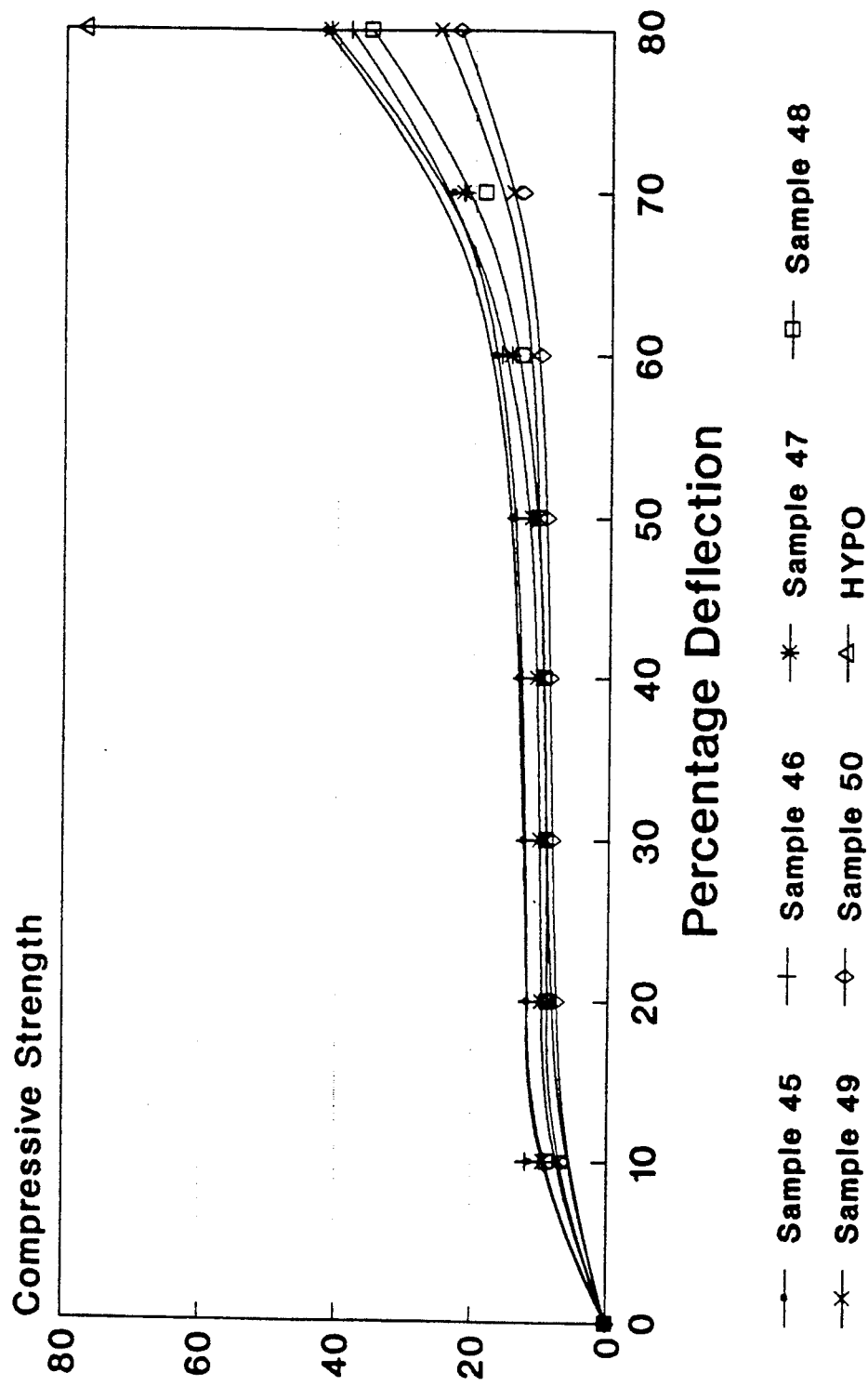

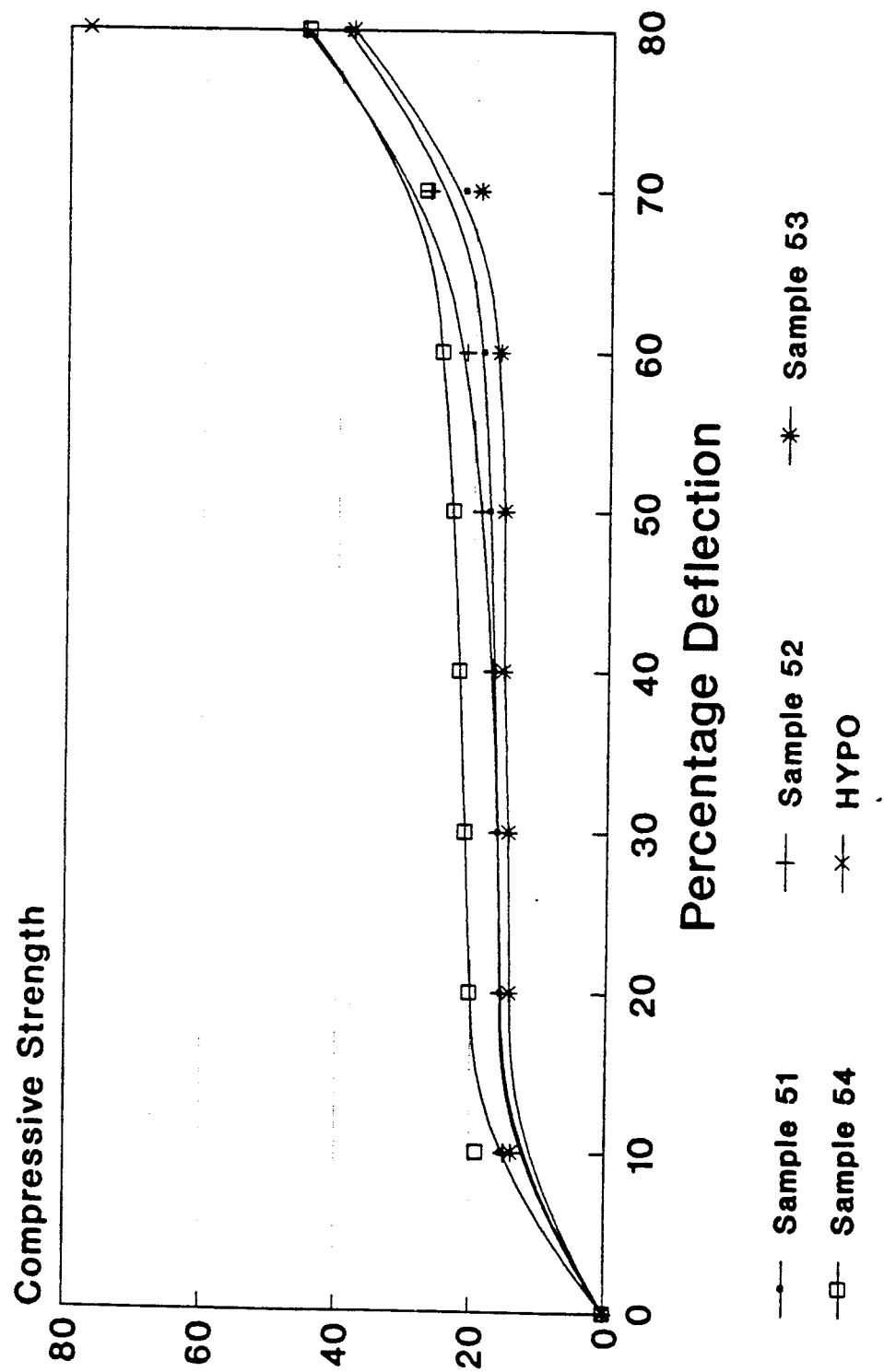

RIGID POLYURETHANE FOAMS CONTAINING LITHIUM SALTS FOR ENERGY ABSORBING APPLICATIONS

This is a division of application Ser. No. 07/850,542 filed Mar. 13, 1992.

BACKGROUND OF THE INVENTION

1. Field of the Invention

This invention relates to energy absorbing rigid polyurethane foam compositions and their methods of preparation. Specifically, the energy absorbing rigid polyurethane compositions of this invention are water blown and employ lithium salts to promote cell opening, enabling the foam to exhibit minimal spring back or hysteresis. Such foams are suitable as lightweight alternatives to traditional energy absorbing applications, such as side impact bolsters in automobile doors and foam blocks for floral arrangements.

2. Description of the Related Art

Recent years have seen an accelerated growth in the field of energy absorbing foams, especially in the automotive industry. Heightened safety concerns over the safety of passengers has generated numerous federal safety standards, among which are passive restraint systems such as air bags. As pointed out in "Fundamental Studies of Polyurethane Foam for Energy Absorption in Automotive Interiors" by J. A. Thompson-Colón, et al. in SAE Technical Paper Series 910404, the advent of air bags has required the automotive industry to look to the manufacture of energy absorbing instrument panels, or knee bolsters, since one tends to slide under a deployed air bag and impact the knee on the panel. Also, currently under study is the use of energy absorbing foams as hip or shoulder bolsters to protect the hip and shoulder regions of a passenger or driver against impacts during collisions to the side of the car.

One of the requirements of a good energy absorbing foam is that it is open celled and exhibits a constant or nearly constant compressive strength at deflections ranging from about 10 percent to about 60 percent. Upon impact, the cell struts and walls crush and thereby dissipate the energy of the impacting object. Air trapped within a closed-celled foam, however, imparts structural strength to the walls and struts upon compression resulting in a resilient foam that exhibits an exponential increase in compressive strength upon continued deflection through the foam. Thus, it is desirable to open the cells of the foam as much as possible.

As is discussed in detail in the description of the invention, it has now been found that the use of lithium salts of an organic acid apparently open the cells of rigid polyurethane foams. The use of lithium salts as catalysts in CFC-blown rigid polyurethane foams is known from such U.S. Pat. No. as 4,107,069, which describes a lithium, sodium or potassium salt of a 2-20 carbon atom carboxylic acid chain as a gel catalyst to preserve the reactivity of a CFC-containing masterbatch for rigid polyurethane foams; U.S. Pat. No. 4,256,847 which describes a mixture of lithium and zinc salts to catalyze rigid foam systems blown by CFCs with the sole use of lithium salts as catalysts discouraged due to their high catalytic activity; U.S. Pat. No. 3,108,975 which describes a mixture of alkali metal hydroxides and alkali metal salts of acids as a catalyst for the production of polyurethane foams blown with high quantities of water, the only examples being that of flexible foams having resiliency and the absence of the hydroxide failing to produce a foamed product; U.S. Pat. No. 3,041,295 which describes a chlorinated phosphate ester containing polyurethane foam (flexibles exemplified) blown with high quantities of water by incorporating a lithium salt into the prepolymer to preserve the foam against humidity breakdown; U.S. Pat. No. 3,634,345 which describes the use of alkali metal salts of o-hydroxycarboxylic acids as a catalyst to polymerize the isocyanate into isocyanurate rings in a coating, elastomer, or foam blown with 5 to 50 parts CFC and optionally water; U.S. Pat. No. 3,769,245 which describes the use of alkali metal salts of carboxylic acids to catalyze the reaction of a dicarboxylic acid with the isocyanate group to release carbon dioxide and produce a thermoplastic polyurethane foam blown in the absence of water; U.S. Pat. No. 3,940,517 which describes alkali metal salts as catalysts in the production of polyisocyanurate foams blown with CFCs, and U.S. Pat. No. 5,084,485 which describes using an alkali metal carboxylate (only potassium acetate mentioned) as a trimerization catalyst in an isocyanurate foam blown with water to yield a closed cell insulation board. In each of these patents, however, the alkali metal salts are employed as catalysts; and none describe energy absorbing properties of a foam. The above patents also describe the production of CFC-blown foams, large water content blown foams, high density foams, resilient foams, predominately polyisocyanurate and closed celled foams, or thermoplastic foams.

Examples of described energy absorbing foams are found in various patents and publications. U.S. Pat. No. 4,866,102 describes moldable energy absorbing rigid polyurethane foam compositions which are prepared by the reaction of a graft polymer dispersion in a polyoxyalkylene polyether polyol with an alkylene oxide adduct of toluenediamine or diaminodiphenylmethane with an organic polyisocyanate in the presence of a crosslinking agent and a chlorofluorocarbon (CFC) blowing agent. Other patents describe energy absorbing foams which are flexible or semi-rigid, are resilient, have utility in bumper cores, and have molded densities in excess of 5 pcf, such as U.S. Pat. Nos. 4,190,712, 4,116,893; 4,282,330; and 4,212,954. The foams described in these patents, although employing the phrase "energy absorbing," are not useful for the purposes of this invention since they exhibit resiliency or recovery. The foams of this invention are rigid and crush upon impact, exhibiting little or no rebound, and preferably have molded densities of less than 2.8 pcf U.S. Pat. No. 4,722,946 describes the production of energy attenuating viscoelastic polyurethane elastomers and foams, rather than rigid foams, comprising mixtures of linear and branched polyol intermediates, polyisocyanates, and optionally, extenders, blowing agents, and the like, in the presence of a catalyst whereby the isocyanate index is varied from about 65 to about 85. U.S. Pat. No. 4,664,563 describes a method of shoring a geological formation which comprises preparing a high density (19 pcf-50 pcf) rigid polyurethane foam having a specific oxyalkylated toluenediamine as the polyol, which exhibits nearly constant strain with increasing stress in compression. Similarly, U.S. Pat. No. 4,614,754 described a high density (>17 pcf) rigid polyurethane foam which exhibits nearly constant strain with increasing stress in compression at high loadings (>600 psi) by reacting a specific alkoxylated toluene diamine. Again, the foam must be prepared by using a specific polyol;

and foams with such high densities and high loadings at yield are not usable for the automotive interior applications described above or as floral foams. U.S. Pat. No. 4,696,954 describes the preparation of high density (>25 pcf) molded polyurethane foams blown with CFCs characterized by high impact strength and good thermal stability.

SUMMARY OF THE INVENTION

It is an object of the invention to manufacture foams having energy absorbing properties utilizing a wide range of polyols commonly employed in the preparation of rigid foams. It is another object of the invention to substitute an environmentally safe blowing agent in the production of low density rigid polyurethane foams for traditional chlorofluorocarbons while retaining energy absorbing properties. It is still another object of the present invention to manufacture a low density molded rigid polyurethane foam having energy absorbing properties, also molded at low packing ratios. A final object of the invention is to produce an energy absorbing foam having a density of less than 2.8 pcf employing less than 8 parts by weight water without the aid of CFCs. The characteristics of the more preferable foams of the invention for interior automotive applications are:

Constant or nearly constant compressive strengths at 10 percent to 60 percent deflection;
2. Blown without the aid of any blowing agent besides reactive blowing agents and employing less than 8 parts by weight of reactive blowing agents;
3. Low density;
4. Little or no limitation on the polyol employed as long as the polyol is suitable for manufacture of rigid foams; and,
5. Low packing ratios.

It has now been found that constancy of the strain exhibited by a foam undergoing deflection is improved by adding a lithium salt of an organic material having at least one carboxylic acid to a wide variety of reactive blown rigid polyurethane foam formulations. The water blown rigid polyurethane foams of the invention exhibit constant or nearly constant compressive strengths at low densities without the necessity of utilizing high pressure molding techniques or high packing ratios. Since the lithium salts apparently act as cell opening agents, one also need not use the high amounts of water typically employed to effect sufficient blowing to open up the cells.

The polyurethane foams of the instant invention find utility in applications requiring energy absorption, such as shoulder bolsters and hip bolsters in automobiles, and floral foams. The foams have predominately polyurethane linkages. The foams can be water blown using less than 8 parts by weight water to achieve densities lower than 2.2 pcf without the aid of volatile hydrocarbon or chlorofluorocarbon blowing agents. Reducing the amount of water employed to prepare low density foams has several advantages, including materials savings since the amount of isocyanate consumed by water is reduced, equipment savings since molds with a lower clamping force can be employed, and safety improvements during molding due to lowered molding pressures.

BRIEF DESCRIPTION OF THE DRAWINGS

FIG. 1 illustrates four curves corresponding to Samples 1-4, with Sample 1 representing a foam without lithium stearate, and Samples 2-4 represent foams made with different amounts of lithium stearates.

FIG. 2 illustrates five curves representing different water blown foams made with lithium acetate exhibiting constant or nearly constant compressive strengths.

FIG. 2A illustrates seven large sloped curves representing water blown foams made without lithium stearate.

FIG. 3 illustrates six curves representing water blown foams made with lithium acetate by the machine mixing and molding technique having constant or nearly constant compressive strengths while undergoing deflection.

FIG. 4 illustrates six curves showing the constancy of foams made with different polyols and lithium acetate, and foams made with lithium acetate dissolved in formic acid.

FIG. 4A illustrates six curves showing the constancy of foams made with different polyols and lithium acetate, and foams made with lithium acetate dissolved in formic acid.

FIG. 5 illustrate the large sloping curves of foams made with no lithium salts or undissolved lithium salts.

FIG. 5A illustrates six curves representing the constancy in compressive strength of six foams having the same composition as the foams of FIG. 5 but made with lithium acetate.

FIG. 6 illustrates four curves representing additional embodiments of foams made with lithium acetate exhibiting constant or nearly constant compressive strengths.

DETAILED DESCRIPTION OF THE INVENTION

Figure 1A:
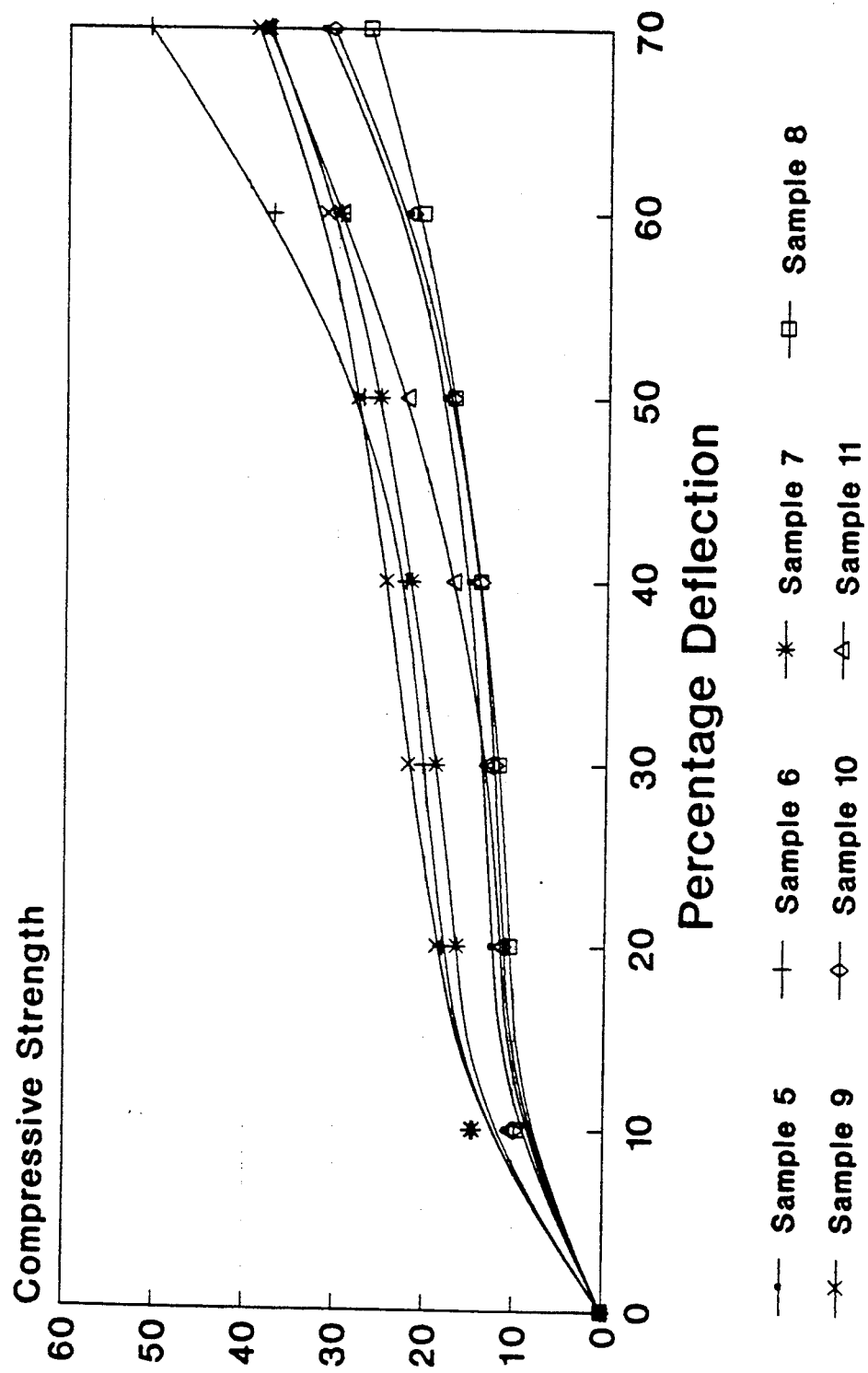
FIG. 1A illustrates seven curves representing the compressive strengths of foams undergoing deflection made with a variety of polyols.

It has been found that a lithium salt of an organic material having at least one carboxylic acid group added to rigid polyurethane foam formulations employing low levels of reactive blowing agents and a wide variety of polyols, molded at low packing ratios, produced foams having constant or nearly constant compressive strengths. The mechanism by which this phenomena occurs is not completely understood, but it appears that the lithium salt acts as a cell opening agent. Without being limited to a theory, it is believed that either the lithium salt causes slight deformations in the cell windows during the exothermic foaming process, thereby causing the windows to rupture at much lower internal pressure, or that the lithium salt embrittles the struts to such a degree that they readily collapse at uniform forces even with closed cells. By opening the cells of the rigid polyurethane foam, an object penetrating the foam crushes the struts of an empty cell rather than crushing cell struts supported by trapped gases. Upon further investigation, however, it was also unexpectedly found that sodium or potassium acetates or stearates failed to yield adequate energy absorbing foams, a possible explanation being that the sodium and potassiums salts may predominately deposit along the struts of the cell rather than the cell window perhaps due to their larger atomic radii.

The organic material of the lithium salt includes saturated or unsaturated aliphatic, cycloaliphatic, or aromatic carboxylic acids having from 2 to 30, preferably 2 to 19 carbon atoms inclusive of the carboxylic acid carbon atom. Suitable carboxylic acids include acetic acid, stearic acid, oleic acid, lauric acid, benzoic acid, and the like, preferably aliphatics, and more preferably acetic acid. To reduce the opportunity for extraneous reactions with the isocyanate, the number of carboxylic acid groups is preferably one. However, the carboxylic acid may contain more than one carboxylic acid group as, for example, citric acid.

The amount of lithium salt contained in the formulation is from 0.01 pbw to about 5.0 pbw, preferably 0.01 pbw to about 3 pbw, more preferably 0.1 pbw to 2 pbw, most preferably 0.5 pbw to 1.0 pbw, based on 100 parts by weight of polyol. The term "polyol" when used as a reference against which other ingredients are measured throughout the disclosure refers to compounds having at least two isocyanate reactive hydrogens, including chain extenders but excluding water and catalysts. Although one may exceed amounts greater than 3.0 pbw, there is no further noticeable improvement in constant compressive strength characteristics.

The lithium salt containing energy absorbing polyurethane foams of this invention may be blown with reactive blowing agents, physically active blowing agents excluding hard or fully halogenated chlorofluorocarbons, or a mixture of the two kinds of blowing agents.

In one preferable embodiment of the invention, the polyurethane foam is completely blown by reactive blowing agents. The phrase "reactive blowing agent" is meant herein as a blowing agent other than a physically active blowing agent such as volatile hydrocarbons, soft chlorofluorocarbons (HCFCs), and fully halogenated hydrocarbons known as hard CFCs. A completely reactive blown foam is one which altogether excludes the presence of the aforementioned physical blowing agents from the foam system.

The phrase "reactive blowing agents" is meant, however, to include chemically reactive blowing agents such as, but not limited to, water, a mixture of water and formic acid, or tertiary alcohols. Formic acid may be added to the resin side as an acid, premixed with the lithium salt, or as a salt dissolved in water. If formic acid or a mixture of premixed formic acid and lithium salt is added, it is preferable to employ 96% aqueous formic acid solution to passivate the metal in molding machines and avoid the rapid corrosion caused by dilute concentrations. A 96% formic acid solution or other aqueous solutions having lower concentrations of formic acid are deemed to be a mixture of formic acid and water. The foam of this invention may also be water blown, meaning a foam system blown without the aid of any other reactive or physical blowing agent.

In another embodiment of the invention, the polyurethane foams can be blown solely with volatile hydrocarbons, soft CFCs each having a boiling point below 28° C. and above −60° C. and which vaporize at or below the temperature of the foaming mass, volatile fluorinated organic compounds, or with a mixture of these physical blowing agent(s) and reactive blowing agent(s). Volatile hydrocarbons include butane, pentane, hexane, heptane, cyclopentane, cyclohexane, pentene, and heptene. Soft CFCs are defined as having at least one hydrogen atom and an ozone depletion potential of less than 0.2, and include 1,1,1-trichlorethane, HCFC-141b, HCFC-22, HCFC-123, and HCFC-142. In another embodiment, a mixture of physical blowing agents, excluding hard CFCs, and reactive blowing agents may be employed. Preferably, the quantity of reactive blowing agent predominates in a mixture with physical blowing agent(s). As the ratio of physical blowing agent to reactive blowing agent increases in a mixture, the total amount of blowing agent required to make a foam at a given density also increases.

The amount of physical blowing agent present, whether used as the sole blowing agent or in a mixture, need not exceed 20 parts by weight based on 100 parts by weight polyol. The amount of reactive blowing agent added in a completely reactive blown foam is effective to blow the polyurethane foam to a density less than or equal to 2.8 pcf for manufacturing bolsters and floral foams. The invention also finds use in other applications requiring a foam with densities greater than 3 pcf, such as the aforementioned 19–50 pcf foams for shoring geological formations. The advantage of the invention is that by using lithium salts the cells of the foam open requiring less blowing agent to achieve the desired density, it yields a foam with a constant or nearly constant compressive strength, and the foam is not limited to a specific polyol.

The amount of water in the system ranges from ? .01 parts by weight to 8.0 parts by weight based on 100 parts by weight of polyol. To achieve molded or free rise densities of less than 2.8, only about 8 parts by weight, preferably less than about 7.5 parts by weight, more preferably less than about 7.0, most preferably less than 6.5 and as low as about 4.5 parts by weight or less of water based on 100 parts by weight of the polyol need be employed in water blown systems. When formic acid and/or salts thereof are added along with water as blowing agents, the amount of water need only be about 0.01 parts by weight to about 5.0 parts by weight, preferably 0.7 to 3.0 parts by weight, more preferably about 0.8 to about 1.5 parts by weight, based on 100 parts by weight of polyol to attain molded or free rise parts having a density of less than 2.8 pcf.

At the above described quantities of water, polyurethane foams having an open cell structure can be molded at densities of 2.8 pcf or less, preferably less than about 2.3 pcf, more preferably less than about 2.2 pcf, most preferably less than 2.0 pcf, with a preferable range being about 1.9 pcf to about 2.2 pcf. Such low molded densities can be attained at the above described low water or water/formic acid mixture quantities by adding small amounts of lithium salts. Instead of packing the mold with large amounts of polyurethane or large amounts of water to effect the "overblowing" necessary to open up the cells, it is believed the lithium salt aids in opening the cells as a cell opening agent advantageously allowing one to use reduced quantities of water to obtain an open celled foam. Free rise densities of less than 2.2 pcf, preferably less than 2.0 pcf, more preferably less than 1.5 pcf, can also be attained at these low water levels and even lower levels when formic acid is admixed, by incorporating lithium salts into the resin side.

The rigid energy absorbing polyurethane foams of the invention preferably exhibit constant or nearly constant compressive strengths at deflections from about 10 percent to about 60 percent and at loads of less than 60 psi; preferably less than 50 psi. The word "constant" is defined herein as a deflection/compressive strength curve which does not deviate more than ±6 psi on either side of the curve at deflections ranging from 10 percent to 60 percent, using the compressive strength measured at 10 percent deflection as the reference point. Preferably, the constancy of compressive strength has a deviation of less than ±5 psi, more preferably less than ±4 psi, most preferably less than about ±3 psi. A "nearly constant" compressive strength is defined as a compressive strength curve which does not deviate more than ±10 psi on either side at deflections ranging from 10 percent to 60 percent measured as described above. In some foam formulations, such as those made with lithium stearate, the deviation will be greater than ±10 psi; nevertheless, foams produced from these formulations exhibit smaller deviations in compressive strengths and better energy absorbing properties than the identical foams made without lithium salts.

The type of isocyanate or isocyanate reactive compounds employed to obtain an energy absorbing polyurethane foam is not restricted to a narrow range of polyols or isocyanates. The lithium salts described herein are employed in a wide variety of rigid polyurethane foams prepared by the reaction of organic polyisocyanate with a compound having at least two isocyanate reactive hydrogens in the presence of a blowing agent, a urethane promoting catalyst, and a surfactant. The reaction is carried out at an index ranging from 60 to 400, preferably 60 to less than 150 to promote polyurethane linkages.

Suitable examples of the compound having at least two isocyanate reactive hydrogens include polyols such as polyoxyalkylene polyether polyols, polyoxyalkylene polyester polyols, and graft polyols; polyhydric polythioethers; polyhydroxyl-containing phosphorous compounds; polyacetals; and aliphatic thiols. These compounds have an average functionality of about 2 to 8, preferably about 3 to 8, a theoretical hydroxyl number from about 300 to about 700, and equivalent weights ranging from about 50 to about 1500, preferably 70 to about 150.

Suitable hydroxy-terminated polyester include those obtained, for example, from polycarboxylic acids and polyhydric alcohols. A suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, therphthalic acid, phthalic acid, hemimellitic acid, and 1,4-cyclohexanedicarboxylic acid. A suitable polyhydric alcohol may be used such as ethylene glycol, propylene glycol, trimethylene glucol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, 1,2,6-hexanetriol, α-methyl glucoside, sucrose, and sorbitol. Also included within the term "polyhydric alcohol" are compounds derived from phenol such as 2,2-bis(4-hydroxyphenyl)-propane, commonly known as Bisphenol A.

Suitable polyoxyalkylene polyether polyol may be used such as the polymerization product of an alkylene oxide with a polyhydric alcohol. Suitable polyhydric alcohols include those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, sucrose, sorbitol, propylene glycol, dipropylene glycol, pentaerythritol, and 2,2-bis(4-hydroxyphenyl)-propane and blends thereof having equivalent weights of from 100 to 5000.

Suitable amines which may be condensed with alkylene oxides include aromatic amines such as aniline, N-alkylphenylenediamines, 2,4'-, 2,2'-, and 4,4'-methylenedianiline, 2,6- or 2,4-toluenediamine, vicinal toluenediamines, o-chloro-aniline, p-aminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine, vicinal toluenediamines, ethylenediamines, and propylenediamine.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Also suitable as the polyol are polymer modified polyols, in particular, the so-called graft polyols. Graft polyols are well known to the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols are also preferred, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, mixtures of 4,4'- and 2,4'-diphenylmethane diisocyanate, 4,4'-biphenylene diisocyanate, 3,3'-dimethoxy-4,4'-biphenyl diisocyanate, 3,3,-dimethyl-4,4,-biphenyl diisocyanate and 3.3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate, and mixtures thereof. Especially useful due to their availability and properties are 4,4'-diphenylmethane diisocyanate, polymethylene polyphenylene polyisocyanate, or mixtures thereof for rigid foams, or a mixture of the foregoing with toluene diisocyanates for semi-rigid foams.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. The preferred or crude isocyanates are disclosed in U.S. Pat. No. 3,215,652.

The constant or near constant compressive strengths, low densities, and low water content are features achieved by adding lithium salts without the necessity for using chain extending agents besides the low amounts of water used for blowing. Thus, chain extenders are optional, and those which may be employed in the preparation of the polyurethane foams include compounds having at least two functional groups bearing active hydrogen atoms such as hydrazine, primary and secondary diamines, amino alcohols, amino acids, hydroxy acids, glycols, or mixtures thereof. The phrase "chain extenders" used herein is not meant to include water. A preferred group of chain-extending agents, if used, includes diethylene glycol, 1,4-butanediol and primary and secondary diamines such as phenylene diamine, 1,4-cyclohexane-bis-(methylamine), ethylenediamine, diethylenetriamine, N-(2-hydroxypropyl)ethylene-diamine, N,N'-di(2-hydroxypropyl)ethylenediamine, piperazine, and 2-methylpiperazine.

Any suitable urethane promoting catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoiate, stannous oxide, as well as other organometallic compounds such as are disclosed in U.S. Pat. No. 2,846,408, incorporated herein by reference.

A surface-active agent is generally necessary for production of high grade polyurethane foam according to the present invention, since in the absence of same, the foams collapse or contain very large uneven cells. Numerous surface-active agents have been found satisfactory. Non-ionic surface active agents are preferred. Of these, the non-ionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

If desired, flame retardants may be incorporated in the foams. Among the flame retardants which may be employed are: pentabromodiphenyl oxide, dibromopropanol, tris(b-chloropropyl)phosphate, 2,2-bis(-bromoethyl) 1,3-propanediol, tetrakis(2-chloroethyl)ethyle diphosphate, bis-(2-chloroethyl) 2-chloroethylphosphonate, molybdenum trioxide, ammonium molybdate, ammonium phosphate, pentabromodiphenyl oxide, tricresylphosphate, hexabromocyclododecane and dibromoethyl dibromocyclohexane. The concentrations of flame retardant compounds which may be employed range from 1 to 25 parts per 100 parts of polyol mixture.

Suitable methods of preparation include the prepolymer technique wherein an excess of organic polyisocyanate is reacted with a polyol to prepare a prepolymer having free isocyanate reactive groups, which is then reacted with a mixture of water, surfactant, and catalyst to obtain the foam. Alternatively, one may employ the quasi-prepolymer technique common in the preparation of rigid foams by reacting only a part of the polyol with the organic polyisocyanate to obtain a quasi-prepolymer, which is then reacted with the remaining portion of polyol in the presence of water, surfactant, and catalyst. Another option is to prepare a foam by reacting all the components in a single working step known as the "one-shot" method. In the one-shot method, the components may be mixed in a mix head or by impingement mixing.

The polyurethane components combined by any one of the above-mentioned techniques may be poured or sprayed into an open mold, which is subsequently closed and clamped, if necessary, to allow the components to fully react, after which the part is demolded and allowed to cure. Alternatively, the polyurethane components may be injected into an open or closed mold, which is subsequently closed if the components were initially injected into an open mold; and the components are allowed to fully react after which the part is demolded and set aside to cure.

Another advantage of the invention is that the open or closed mold may be packed by pouring, injecting, or spraying the polyurethane components at a packing ratio of 1.7 or less to obtain a foam at the low given density; whereas, other water blown foams typically require packing ratios of 2.0 to 8 to obtain foams with an open cell content at the same given density. The phrase "packing ratio" is defined herein as the ratio of the actual molded density to the free rise density. The low packing ratio is made possible by incorporating a lithium salt into the polyurethane foam formulation. The lower packing ratio decreases mold pressure, enhances safety, and reduces the amount of isocyanate consumed by the lowered quantity of water. Preferable packing ratios range from 1.1 to 1.5, more preferably 1.1 to 1.3, to obtain foams having molded densities ranging from about 1.9 to 2.8, preferably about 1.9 to 2.4, more preferably about 1.9 to 2.3.

The mixed polyurethane components may also be poured, injected, or sprayed into open cavities or molds and allowed to free rise instead of reacting in a closed mold, such as in the production of slab stock which is cut into a desired shape, a pour-in-place method of applying rigid polyurethane between panels used as the final part, or a pour-behind method of foaming.

When using the one-shot process, the lithium salts of the invention should be pre-dissolved in water, formic acid, or the polyol depending on the solubility of the organic portion of the salt. Instead of pre-dissolving the lithium salt prior to metering, the lithium salt may be separately metered and added to the formulation as a solid. However, the salt must be milled to a fine dust as large granules fail to quickly dissolve in the formulation and fail to open up the cells of the foam. Regardless of which foaming method is employed, the prepolymer, one-shot, or quasi-prepolymer method, it is preferred to predissolve the lithium salt in either the polyol or water, most preferably dissolved in water as a solution which is added to the resin side or dissolved in formic acid as a solution which is added to the resin side.

The following examples illustrate various embodiments of the invention and are not intended to limit the description of the invention above. The parts referred to in the Examples are parts by weight. The following abbreviations are employed:

Polyol A is an ethylene oxide-propylene oxide adduct of a mixture of vicinal toluene diamine and dipropylene glycol containing a polyoxypropylene polyether cap and having an hydroxyl number of 450 and is commercially available from BASF Corporation as Pluracol® 1132 polyol.

Polyol B is a vicinal toluene diamine initiated ethylene oxide-propylene oxide adduct containing a 48 percent polyoxypropylene polyether cap having a theoretical hydroxyl number of 390 and is commercially available from BASF Corporation as Pluracol® 824 polyol.

Polyol C is an all propylene oxide adduct of a mixture of sucrose and propylene glycol having a theoretical hydroxyl number of 570 and is commercially available from BASF Corporation as Pluracol® 240 polyol.

Polyol D is a sucrose-dipropylene glycol initiated all propylene oxide adduct having a theoretical hydroxyl number of 397 and is commercially available from BASF Corporation as Pluracol® 975 polyol.

Polyol E is a pentaerythritol-dipropylene glycol initiated all propylene oxide adduct having a hydroxyl number of 555 and is commercially available from BASF Corporation as Pluracol® PEP 450 polyol.

Polyol F is a pentaerythritol-propylene glycol initiated all propylene oxide adduct having a theoretical hydroxyl number of 450 and is commercially available from BASF Corporation as Pluracol® PEP 550 polyol.

Polyol G is a monoethanolamine ethylene oxide-propylene oxide adduct containing a polyoxyethylene polyether cap and having a theoretical hydroxyl number of 500 and is commercially available from BASF Corporation as Pluracol® 1016 polyol.

Polyol H is a glycerine initiated all propylene oxide adduct having a theoretical hydroxyl number of 398 and is commercially available from BASF Corporation as Pluracol® GP 430 polyol.

Polyol I is a trimethylolpropane initiated propylene oxide adduct having a theoretical hydroxyl number of 398 and is commercially available from BASF Corporation as Pluracol® TP 440 polyol.

Polyol J is a propylene oxide adduct of ethylenediamine having a theoretical hydroxyl number of 767 and is commercially available from BASF Corporation as Quadrol® polyol.

DEG is diethylene glycol having a theoretical hydroxyl number of 1016.

Polycat 8 is a dimethylcyclohexylamine (DMCHA) catalyst sold by Air Products.

TMHDA is tetramethylhexanediamine, a urethane-promoting catalyst.

L-550 is a silicone surfactant commercially available from Union Carbide.

DC-193 is a silicone surfactant sold by Dow Corning.

BiCat V is a bismuth based urethane promoting catalyst commercially available from Shepard Chemical employed to reduce tack free time.

ISO A is a solvent free polymethylene polyphenylisocyanate having a functionality of about 2.7 and an NCO content of about 31.8 weight percent commercially available from BASF Corporation as LUPRANATE™ M205 isocyanate.

Throughout the various examples and tables, those sample appearing with an asterisk (*) were made for comparison purposes. In Table I, samples 1–4 compare the effect of lithium stearate on various rigid polyurethane foams with identical formulations, each differing only in the amount of lithium stearate employed. Samples 5-11 examined the effect of 1.0 pbw lithium stearate salt at 1 pbw on rigid foam formulations employing different polyols. The amount of water measured in parts by weight ranged from about 6.6 to 8.4 to maintain a water concentration of 2 weight percent based on the weight of the foam formulation.

Lithium stearate was dissolved in a mixture of polyols and DEG in the amounts shown in Table I. To this mixture was added the catalyst, surfactant, and water in the amounts shown and stirred for about 30 seconds. The isocyanate was then added to the resin in the amount shown in Table I, the mixture stirred for seven seconds, and allowed to foam freely. The free rise densities are recorded on Table I.

Portions of the batches from each of the hand-mixed samples were poured into open preheated 9"×9"×1" metal molds at the designated temperatures and subsequently plugged. After demolding the rigid foams, their molded part densities were measured and recorded, along with the packing ratio, as shown in Table I below. The compressive strengths of the molded samples were subsequently tested.

TABLE 1

| | SAMPLE | | | | | | | | | | |
|---|---|---|---|---|---|---|---|---|---|---|---|
| | 1* | 2 | 3 | 4 | 5 | 6 | 7 | 8 | 9 | 10 | 11 |
| Polyol A | 60 | 60 | 60 | 60 | 60 | | | | | | |
| Polyol B | | | | | | 40 | | | | | |
| Polyol J | | | | | | | 60 | | | | |
| Polyol C | | | | | | | | 60 | | | |
| Polyol D | | | | | | | | | 60 | | |
| Polyol E | | | | | | | | | | 60 | |
| Polyol F | | | | | | | | | | | 60 |
| Polyol G | | | | | | | | | | | |
| Polyol H | 35 | 35 | 35 | 35 | 35 | 35 | 35 | 35 | 35 | 35 | 35 |
| DEG | 5 | 5 | 5 | 5 | 5 | 5 | 5 | 5 | 5 | 5 | 5 |
| LI. STEARATE | 0 | 0.5 | 1 | 2 | 1 | 1 | 1 | 1 | 1 | 1 | 1 |
| WATER ACTUAL WT. | 6.79 | 6.85 | 6.87 | 6.90 | 6.58 | 7.17 | 6.63 | 7.35 | 6.87 | 7.11 | 8.39 |
| WATER per 100 pbw polyol | 7.14 | 7.21 | 7.23 | 7.26 | 6.92 | 7.54 | 6.97 | 7.73 | 7.23 | 7.48 | 8.83 |
| TMHDA | 1.5 | 1.5 | 1.5 | 1.5 | 1.5 | 1.5 | 1.5 | 1.5 | 1.5 | 1.5 | 1.5 |
| UC L550 | | | | | | | | | | | |
| TOTAL | 107.79 | 109.85 | 110.37 | 111.40 | 110.08 | 110.67 | 110.13 | 110.85 | 110.37 | 110.61 | 111.89 |
| INDEX | 110 | 110 | 110 | 110 | 110 | 110 | 110 | 110 | 110 | 110 | 110 |
| ISO A | 231.9 | 232.9 | 233.1 | 233.6 | 219.0 | 248.0 | 221.3 | 256.6 | 233.1 | 244.9 | 307.7 |
| DESIRED % H₂O | 2 | 2 | 2 | 2 | 2 | 2 | 2 | 2 | 2 | 2 | 2 |
| BROOKFIELD VISCOSITY CPS@76F | 1010 | 950 | 975 | 1000 | 865 | 2360 | 780 | 534 | 430 | 272 | 1000 |
| SPINDLE | 3 | 3 | 3 | 3 | 3 | 3 | 3 | 3 | 3 | 3 | 3 |
| SPEED | 20 | 20 | 20 | 20 | 20 | 20 | 20 | 50 | 50 | 50 | 50 |
| READING | 20.2 | 19.0 | 19.5 | 20.0 | 17.3 | 47.2 | 15.6 | 26.7 | 21.5 | 13.6 | 50 |
| FACTOR | 50 | 50 | 50 | 50 | 50 | 50 | 50 | 20 | 20 | 20 | 20 |
| APPEARANCE | CLOUDY | CLOUDY | CLOUDY | CLOUDY | CLOUDY | CLOUDY | CLOUDY | CLOUDY | CLOUDY | CLOUDY | CLOUDY |
| 1 QT. CUP | | | | | | | | | | | |
| RESIN | 19.0 | 19.2 | 19.3 | 19.4 | 20.1 | 18.5 | 19.9 | 18.1 | 19.3 | 18.7 | 16.0 |
| ISO | 41.0 | 40.8 | 40.7 | 40.6 | 39.9 | 41.5 | 40.1 | 41.9 | 40.7 | 41.3 | 44.0 |
| MIX (SEC) | 7 | 7 | 7 | 7 | 7 | 7 | 7 | 7 | 7 | 7 | 7 |
| GEL (SEC) | 36 | 38 | 36 | 36 | 42 | 48 | 59 | 61 | 63 | 27 | 28 |
| TACK FREE (SEC) | 60 | 58 | 58 | | 75 | 66 | 115 | 86 | 120 | 38 | 35 |
| CUP DENSITY | 1.74 | 1.75 | 1.79 | 1.83 | 1.74 | 2.32 | 1.89 | 1.57 | 1.83 | 1.85 | 1.90 |
| 9 × 9 × 2 PACKED PANEL | | | | | | | | | | | |
| RESIN | 28.6 | 28.8 | 26.9 | 29.1 | 30.1 | 27.8 | 29.9 | 27.1 | 28.9 | 28.0 | 24.0 |
| ISO | 61.4 | 61.2 | 61.1 | 60.9 | 59.9 | 62.2 | 60.1 | 62.9 | 61.1 | 62.0 | 66.0 |
| ACTUAL WT. GRS. | 43.2 | 42.8 | 47.4 | 46.6 | 45.6 | 57.4 | 48.2 | 38.6 | 48.2 | 50.4 | 48.3 |
| MOLDED DENSITY/PCF | 2.08 | 2.06 | 2.28 | 2.24 | 2.19 | 2.76 | 2.32 | 1.86 | 2.32 | 2.42 | 2.32 |
| CORE DENSITY | 1.73 | 1.54 | 1.52 | 1.75 | 1.48 | 2.35 | 1.79 | 1.6 | 1.66 | 1.65 | 1.71 |
| MOLD TEMP. F. | 142 | 145 | 141 | 140 | 146 | 142 | 140 | 140 | 136 | 140 | 136 |
| PACKING RATIO | 1.2 | 1.18 | 1.27 | 1.22 | 1.26 | 1.19 | 1.23 | 1.18 | 1.27 | 1.31 | 1.22 |

The molded foam samples were cut into squares measuring 2 inches wide, 1 inch long, and 2 inches thick and tested for compressive strength at 10 percent deflection intervals according to ASTM D-1621, at a crosshead speed of 0.3 inches/minute, 50 percent humidity, and 73° F. The numbers corresponding to each sample represent an average value taken from three specimens.

CHART 1

| SAMPLE NO. | STRENGTH AT YIELD (psi) | STRENGTH AT 10% CRUSH (psi) | STRENGTH AT 20% CRUSH (psi) | STRENGTH AT 30% CRUSH (psi) | STRENGTH AT 40% CRUSH (psi) |
| --- | --- | --- | --- | --- | --- |
| 1* | — | 8.26 | 11.24 | 13.06 | 14.82 |
| 2 | 13.59 | 12.81 | 14.36 | 15.42 | 16.87 |
| 3 | 14.29 | 11.43 | 13.86 | 15.04 | 16.14 |
| 4 | 13.25 | 12.57 | 13.56 | 14.57 | 15.61 |
| 5 | 12.29 | 10.86 | 12.56 | 13.61 | 15.27 |
| 6 | 21.04 | 14.70 | 18.05 | 20.33 | 22.34 |
| 7 | 14.62 | 14.41 | 16.41 | 18.86 | 21.73 |
| 8 | 10.05 | 9.54 | 10.42 | 11.81 | 13.97 |
| 9 | — | 14.58 | 18.68 | 21.9 | 24.48 |
| 10 | 10.63 | 9.90 | 11.28 | 12.31 | 13.95 |
| 11 | 11.15 | 10.36 | 11.51 | 13.11 | 16.85 |

| SAMPLE NO. | STRENGTH AT 50% CRUSH (psi) | STRENGTH AT 60% CRUSH (psi) | STRENGTH AT 70% CRUSH (psi) | STRENGTH AT 80% CRUSH (psi) |
| --- | --- | --- | --- | --- |
| 1* | 18.73 | 27.18 | 41.03 | 77.22 |
| 2 | 19.05 | 23.14 | 31.54 | 55.42 |
| 3 | 18.95 | 23.52 | 31.67 | 56.43 |
| 4 | 17.36 | 21.89 | 32.71 | 60.48 |
| 5 | 18.07 | 22.08 | 31.71 | 58.45 |
| 6 | 27.20 | 37.28 | 51.01 | 96.65 |
| 7 | 25.24 | 29.83 | 37.78 | 64.27 |
| 8 | 17.01 | 20.6 | 26.58 | 42.84 |
| 9 | 27.69 | 31.29 | 39.05 | 68.33 |
| 10 | 17.21 | 21.7 | 30.68 | 55.73 |
| 11 | 22.13 | 29.51 | 37.97 | 69.02 |

FIG. 1 graphically illustrates the data points for the values set forth for Samples 1*–4 in Chart I and demonstrates that the constancy of the compressive strengths at deflections ranging from 10 percent to 60 percent for rigid foam Samples 2-4 employing lithium stearate is improved a rigid foam Sample 1* without lithium stearate having identical types of polyols, isocyanate, catalyst, surfactant, and total amounts of water, at molded densities less than 2.3 pcf, water contents less than 7 pbw, and packing ratios ranging from 1.18 to 1.27.

Chart I and FIG. 1A also show that lithium stearate imparts energy absorbing characteristics to water blown rigid foams made with a wide range of polyols as in Samples 5-11. The water content in parts by weight was varied to maintain a constant 2 weight percent water content based on the weight of the whole formulation.

EXAMPLE 2

In this example, the effects of lithium acetate, commercially available from FMC Corporation—Lithium Division in North Carolina, and a mixture of lithium acetate and ammonium formate on the constancy of compressive strength were examined. For comparison purposes, water blown Samples 16-22 were prepared at various free rise densities and their compressive strengths tested. The type and amount of ingredients as shown in Table II were hand mixed according to the procedure of Example 1. Lithium acetate was dissolved in water prior to addition to the resin. Samples 12, 13, and 16-22 were poured into quart cups and allowed to free rise, and samples 14, 15, and 23 were poured into a 4"×10"×10" cake box, plugged, and subsequently demolded upon completion of the reaction.

TABLE II

| | SAMPLE NO. | | | | | | | | | | | |
| --- | --- | --- | --- | --- | --- | --- | --- | --- | --- | --- | --- | --- |
| | 12 | 13 | 14 | 15 | 16* | 17* | 18* | 19* | 20* | 21* | 22* | 23 |
| Polyol A | 60 | 60 | 60 | 60 | 60 | 60 | 60 | 60 | 60 | 60 | 60 | 60 |
| Polyol H | 40 | 40 | 40 | 40 | 40 | 40 | 40 | 40 | 40 | 40 | 40 | 40 |
| DC-193 | 1.5 | 1.5 | 1.5 | 1.5 | 1.5 | 1.5 | 1.5 | 1.5 | 1.5 | 1.5 | 1.5 | 1.5 |
| Polycat 8 | 1.5 | 1.5 | 1.5 | 1.5 | 0.2 | 0.2 | 0.2 | 0.2 | 0.2 | 0.2 | 0.2 | 1.5 |
| BiCat V | — | — | — | — | 0.2 | 0.2 | 0.2 | 0.2 | 0.2 | 0.2 | 0.2 | — |
| Lithium Acetate(a) Sol. | 10.04 | 7.27 | 7.27 | 8.05 | — | — | — | — | — | — | — | 5.22 |
| LiOAC/100 pbw polyol | 3.54 | 2.56 | 2.56 | 2.84 | — | — | — | — | — | — | — | 1.84 |
| Ammonium Formate(b) Sol. | — | — | — | — | — | — | — | — | — | — | — | 3.19 |
| Water | — | 1.80 | 0.08 | 0.09 | 3.0 | 3.5 | 4.0 | 4.5 | 5.0 | 5.5 | 6.0 | 2.25 |
| Water per 100 pbw polyol | 6.50 | 6.50 | 4.78 | 4.78 | 3.0 | 3.5 | 4.0 | 4.5 | 5.0 | 5.5 | 6.0 | 7.0 |
| ISO A | 229.1 | 229.2 | 197.1 | 218.3 | 161 | 169 | 177 | 185 | 193 | 202 | 210 | 231.1 |
| Index | 115.7 | 115.7 | 114 | 114 | 110 | 110 | 110 | 110 | 110 | 110 | 110 | 105.6 |
| Mix Time (s) | 7 | 7 | 7 | 7 | 7 | 7 | 7 | 7 | 7 | 7 | 7 | 7 |
| Cream Time (s) | 14 | 13 | — | — | 24.5 | 26.2 | 30.3 | 28.8 | 33.4 | 32.3 | 32.6 | — |
| Gel Time (s) | 40 | 38 | — | — | 72 | 79 | 94 | 90 | 105 | 113 | 108 | — |
| Rise Time (s) | 65 | 65 | — | — | 118 | 139 | 159 | 174 | 158 | 173 | 162 | — |
| Tack Free (s) | 54 | 51 | — | — | 108 | 122 | 146 | 169 | 198 | 242 | 214 | — |

TABLE II-continued

| | SAMPLE NO. | | | | | | | | | | | |
|---|---|---|---|---|---|---|---|---|---|---|---|---|
| | 12 | 13 | 14 | 15 | 16* | 17* | 18* | 19* | 20* | 21* | 22* | 23 |
| Free Rise Cup Density (pcf) | 1.54 | 1.48 | — | — | 3.37 | 3.12 | 2.76 | 2.52 | 2.29 | 2.18 | 2.12 | — |
| Free Rise Core Density (pcf) | 1.32 | 1.30 | — | — | 3.06 | 2.32 | 2.21 | 2.09 | 1.90 | 1.59 | 1.56 | — |
| Molded Density (pcf) | — | — | 2.47 | 2.80 | — | — | — | — | — | — | — | 1.74 |
| Molded Core Density (pcf) | — | — | 2.2 | 2.45 | — | — | — | — | — | — | — | 1.65 |

(a) a solution of lithium acetate obtained by dissolving 120 g LiOAc-2H$_2$O in 100 g water, yielding 35.29 percent LiOAc and 64.71 percent water including dihydrate.
(b) 150 g ammonium formate dissolved in 200 g H$_2$O (42.86% H$_2$O).

Each foam sample was tested for compressive strength according to ASTM D-1621 using cut 3" wide, about 1" long, and 3" thick specimens at a crosshead speed of 0.3 in/min., 50 percent humidity, and 73° F.

The results obtained from the tests are reported on Chart II below and the values for Samples 12, 13, and 16 represent an average of two specimens; those for Samples 14 and 15 represent a test performed on one specimen.

CHART II

| SAMPLE NO. | STRENGTH AT YIELD (psi) | STRENGTH AT 10% CRUSH (psi) | STRENGTH AT 20% CRUSH (psi) | STRENGTH AT 30% CRUSH (psi) | STRENGTH AT 40% CRUSH (psi) |
|---|---|---|---|---|---|
| 12 | 18.71 | 19.48 | 19.56 | 19.67 | 19.85 |
| 13 | 17.55 | 18.70 | 19.38 | 19.27 | 19.56 |
| 14 | 42.4 | 43.25 | 43.71 | 44.58 | 45.19 |
| 15 | 49.54 | 50.27 | 51.00 | 50.65 | 50.29 |
| 16* | — | 34.86 | 36.28 | 38.78 | 42.15 |
| 17* | — | 26.47 | 28.65 | 31.17 | 34.56 |
| 18* | — | 20.67 | 22.29 | 24.67 | 27.85 |
| 19* | — | 16.63 | 18.18 | 20.45 | 23.37 |
| 20* | — | 15.16 | 16.58 | 18.60 | 21.28 |
| 21* | — | 12.95 | 14.58 | 16.67 | 19.52 |
| 22* | — | 11.43 | 12.80 | 14.74 | 17.39 |
| 23 | 34.89 | 35.14 | 34.74 | 35.11 | 35.71 |

| SAMPLE NO. | STRENGTH AT 50% CRUSH (psi) | STRENGTH AT 60% CRUSH (psi) | STRENGTH AT 70% CRUSH (psi) | STRENGTH AT 80% CRUSH (psi) |
|---|---|---|---|---|
| 12 | 19.75 | 19.94 | 20.64 | 28.49 |
| 13 | 19.94 | 20.41 | 21.42 | 32.69 |
| 14 | 45.69 | 45.86 | 48.42 | 71.12 |
| 15 | 50.70 | 51.82 | 53.64 | 86.72 |
| 16* | 47.54 | 58.24 | 79.41 | 135.5 |
| 17* | 40.06 | 49.82 | 68.21 | 113.0 |
| 18* | 32.58 | 41.41 | 57.58 | 95.33 |
| 19* | 27.65 | 35.48 | 49.49 | 79.14 |
| 20* | 25.16 | 32.17 | 45.24 | 73.5 |
| 21* | 23.88 | 31.11 | 43.92 | 71.31 |
| 22* | 21.02 | 27.37 | 39.20 | 63.13 |
| 23 | 36.65 | 37.84 | 40.21 | 49.56 |

FIG. 2 graphically illustrates the flatness of curves from 10 percent deflection to 60 percent deflection for lithium acetate containing Samples 11–15 and 23; and by comparison, FIG. 2A shows the much larger deviations in compressive strengths for comparative Samples 16*–22* which were water blown without any lithium salts.

The results from Chart II and illustrated in FIG. 2 demonstrate a constant compressive strength for water blown Samples 12–15 and 23 containing lithium salts with deviations between 10 percent to 60 percent deflections of less than 0.5 psi for Sample 12, less than 1.8 psi for Sample 13, less than 2.7 psi for Sample 14 at a molded density of 2.47 pcf and a water content of less than 5 pbw/100 pbw polyol, less than 1.6 psi for Sample 15 at a 2.8 pcf molded density and a water content of less than 5 pbw/100 pbw polyol, and a deviation of 2.7 psi for Sample 23 at a 1.74 pcf molded density and a water content of 7 pbw/100 pbw polyol.

The advantage in constancy of compressive strength obtained by using lithium salts is readily apparent upon comparison of Samples 16*–22* with Samples 12–15. The molded Samples 14 and 15 having molded densities of 2.47 pcf and 2.80 pcf exhibit much flatter curves than do Samples 18*–22* having similar free rise densities from 2.12 pcf to 2.76 pcf. One would expect a molded part to have a greater closed cell content and thus an inferior compressive strength profile to a free rise sample at the equivalent density. Nevertheless, by incorporating lithium salts into the formulation, the tests demonstrate a great improvement in the constancy of compressive strengths of lithium salt containing foams, even molded foams, over non-lithium salt containing foams at the same density. Furthermore, a comparison between the free rise densities of Samples 12 and 13 and Sample 22* shows that about the same amount of water content, systems containing lithium acetate produced foams having lower densities and much flatter compressive strength curves.

A comparison of the curves from FIG. 1 and FIG. 2 shows that although lithium stearate improved the compressive strength characteristics of the molded foam as shown in Samples 2-4 over the same foam without lithium stearate as in Sample 1*, molded Samples 14 and 15 yielded a greater improved performance by using lithium acetate over lithium stearate. A mixture of lithium acetate and ammonium formate also yielded excellent flat compressive strength curves.

EXAMPLE 3

In this example, the effect of lithium acetate on molded samples manufactured by a low pressure ADMIRAL machine using the one-shot process was examined. Molded samples having the same kinds and amounts of ingredients but at various densities were also compared to each other. The parameters were as follows:

| Machine | Low Pressure |
|---|---|
| Component Temperature | |
| Resin °C. | 24 |
| Isocyanate °C. | 22 |
| Mixing Pressure | |
| Resin (psi) | 80 |
| Isocyanate (psi) | 100 |
| Throughput lbs./min. | 14.3 |
| Processing Mode | Open Mold Pour |

The types and amounts of ingredients were shot according to the formulation below in Table III. Except for Sample 17 which was shot into a five-gallon payliner, the formulations were shot into a 4"×10"×10" cake box, plugged, and allowed to react to completion.

TABLE III

| | SAMPLE NO. | | | | | |
|---|---|---|---|---|---|---|
| | 24 | 25 | 26 | 27 | 28 | 29 |
| POLYOL A | 60 | 60 | 60 | 60 | 60 | 60 |
| POLYOL H | 40 | 40 | 40 | 40 | 40 | 40 |
| DC 193 | 1.5 | 1.5 | 1.5 | 1.5 | 1.5 | 1.5 |
| POLYCAT 8 | 2.0 | 2.0 | 2.0 | 2.0 | 2.0 | 2.0 |
| LITHIUM ACETATE SOL. (a) | 2.94 | 2.94 | 2.94 | 2.94 | 2.94 | 2.94 |
| FORMIC ACID SOL (b) | 4.39 | 4.39 | 4.39 | 4.39 | 4.39 | 4.39 |
| TOTAL WATER/100 pbw polyol | 4.47 | 4.47 | 4.47 | 4.47 | 4.47 | 4.47 |
| ISO A | 188.8 | 188.8 | 188.8 | 188.8 | 188.8 | 188.8 |
| INDEX | 105 | 105 | 105 | 105 | 105 | 105 |
| SHOT WT. (g) | 649.2 | 216.4 | 233.7 | 246.7 | 268.3 | 283.5 |
| SHOT TIME (s) | 6.0 | 2.00 | 2.16 | 2.28 | 2.48 | 2.62 |
| MOLDED DENSITY (pcf) | n/a | 1.56 | 1.71 | 1.82 | 1.98 | 2.22 |
| MOLDED CORE DENSITY (pcf) | 1.32 | 1.29 | 1.36 | 1.43 | 1.54 | 1.68 |

(a): Solution of 41.1 g lithium acetate dihydrate in 100 g of water.
(b): Solution of 88.4 g formic acid (96% acid) in 100 g of water.

Three specimens of each sample measuring 3" wide, 3" thick, and about 1" long were tested according to the procedures of Examples 1 and 2 at 73° F. and are set forth in Chart III below. Each value represents an average of the three tested specimens.

CHART III

| SAMPLE NO. | STRENGTH AT YIELD (psi) | STRENGTH AT 10% CRUSH (psi) | STRENGTH AT 20% CRUSH (psi) | STRENGTH AT 30% CRUSH (psi) | STRENGTH AT 40% CRUSH (psi) |
|---|---|---|---|---|---|
| 24 | 16.46 | 16.47 | 16.47 | 16.65 | 17.15 |
| 25 | 25.37 | 25.11 | 25.52 | 25.46 | 25.83 |
| 26 | 26.74 | 26.89 | 26.99 | 27.90 | 27.43 |
| 27 | 29.93 | 30.11 | 30.11 | 30.20 | 30.77 |
| 28 | 31.49 | 31.52 | 31.10 | 31.46 | 32.37 |
| 29 | 34.88 | 34.85 | 34.35 | 35.32 | 36.80 |

| SAMPLE NO. | STRENGTH AT 50% CRUSH (psi) | STRENGTH AT 60% CRUSH (psi) | STRENGTH AT 70% CRUSH (psi) | STRENGTH AT 80% CRUSH (psi) |
|---|---|---|---|---|
| 24 | 18.44 | 21.39 | 27.88 | 45.9 |
| 25 | 26.24 | 26.72 | 30.15 | 49.0 |
| 26 | 27.65 | 28.52 | 32.82 | 53.8 |
| 27 | 31.09 | 32.03 | 36.57 | 59.8 |
| 28 | 33.78 | 36.14 | 42.02 | 70.0 |
| 29 | 38.57 | 41.09 | 43.69 | 69.3 |

FIG. 3 shows the compressive strength curves for each of the machine shot molded samples at various densities. As can be seen from the curves, the compressive strength constancy for machine-run molded samples at all the molded densities is well within ±10 psi and is within only ±2 psi at molded densities from 1.56 to 1.82.

EXAMPLE 4

In this example, the effect of lithium acetate on other polyols is examined along with the effect that lithium acetate dissolved water vs. formic acid has on the constancy of compressive strength.

The foams of Samples 30-35 were mixed in quart cups, poured into one-gallon cups, and allowed to free rise while the foams of Samples 36-41 were poured into 4"×10"×10" cake boxes, plugged, allowed to react to completion, and demolded. All foams were handmixed by the procedure described in Example 1 using the types and amounts of ingredients along with the mix times set forth in Table IV below.

TABLE IV

| | SAMPLE NO. | | | | | | | | | | | |
|---|---|---|---|---|---|---|---|---|---|---|---|---|
| | 30 | 31 | 32 | 33 | 34 | 35 | 36 | 37 | 38 | 39 | 40 | 41 |
| POLYOL C | 50 | 50 | 50 | 50 | 50 | 50 | 45.5 | 44.7 | 46.9 | 48.5 | 44.75 | 46.9 |
| POLYOL H | 50 | 50 | 50 | — | — | — | 45.4 | 44.7 | 46.9 | — | — | — |
| POHYOL I | — | — | — | 50 | 50 | 50 | — | — | — | 48.5 | 44.75 | 46.9 |
| DC-193 | 0.6 | 0.6 | 0.6 | 0.6 | 0.6 | 0.6 | 0.55 | 1.53 | 0.56 | 0.59 | 0.53 | 0.56 |
| LITHIUM ACETATE IN FORMIC ACID (a) | 9.09 | — | 7.46 | 9.09 | — | 7.46 | 8.27 | — | 6.99 | 8.82 | — | 6.99 |
| LITHIUM ACETATE IN WATER (b) | — | 5.5 | 0.99 | — | 5.5 | 0.99 | — | 4.92 | 0.93 | — | 4.92 | 0.93 |
| WATER (b) | | | | | | | | | | | | |
| FORMIC ACID | 3.91 | — | — | 3.91 | — | — | 3.56 | — | — | 3.79 | — | — |
| WATER | — | 3.7 | 2.65 | — | 3.7 | 2.65 | — | 3.32 | 2.48 | — | 3.32 | 2.48 |
| WATER/100 pbw polyol | 1.47 | 7.26 | 4.37 | 1.47 | 7.26 | 4.37 | 1.25 | 6.50 | 4.02 | 1.25 | 6.50 | 4.02 |
| POLYCAT 8 | — | 1.0 | — | — | 1.0 | — | — | 0.90 | — | — | 0.90 | — |
| BiCat V | 0.3 | 0.3 | 0.3 | 0.3 | 0.3 | 0.3 | 0.27 | 0.27 | 0.28 | 0.29 | 0.27 | 0.28 |
| ISO A | 172.6 | 199.8 | 186.2 | 172.6 | 199.8 | 186.2 | 157.1 | 178.9 | 174.7 | 167.4 | 178.9 | 167.4 |
| INDEX | 90 | 90 | 90 | 90 | 90 | 90 | 90 | 90 | 90 | 90 | 90 | 90 |
| MIX TIME (s) | 10 | 8 | 8 | 8 | 8 | 8 | 8 | 8 | 8 | 8 | 8 | 8 |
| CREAM (s) | <10 | 29.1 | 18.7 | 17.2 | 23.6 | 20.9 | — | — | — | — | — | — |
| GEL (s) | 14.4 | 85.7 | 105 | 55.1 | 93.5 | 113 | — | — | — | — | — | — |
| RISE (s) | 49.8 | 130 | 152 | 89.8 | 124 | 176 | — | — | — | — | — | — |
| WEIGHT IN BOX (g) | — | — | — | — | — | — | 207.2 | 232.1 | 234.6 | 219.5 | 231.7 | 228.9 |
| DENSITY CUP (pcf) | 1.56 | 1.89 | 2.13 | 1.70 | 1.90 | 1.80 | — | — | — | — | — | — |
| MOLDED DENSITY (pcf) | — | — | — | — | — | — | 1.97 | 2.21 | 2.23 | 2.09 | 2.20 | 2.18 |
| DENSITY CORE (pcf) | 1.28 | 1.63 | 2.02 | 1.56 | 1.53 | 1.72 | 1.33 | 1.55 | 2.03 | 1.61 | 1.91 | 1.89 |

(a) 50 g LiOAc.2H$_2$O in 100 g Formic Acid 96% (13.43% H$_2$O)
(b) 120 g LiOAc.2H$_2$O in 100 g water (64.7% H$_2$O)

The samples were cut into 2" wide, 2" thick, 1" long sections and tested by the procedures described in Example 1. The results are set forth below and represent an average of three specimens for each reported valve.

CHART IV

| SAMPLE NO. | STRENGTH AT 10% CRUSH (psi) | STRENGTH AT 20% CRUSH (psi) | STRENGTH AT 30% CRUSH (psi) | STRENGTH AT 40% CRUSH (psi) | STRENGTH AT 50% CRUSH (psi) | STRENGTH AT 60% CRUSH (psi) | STRENGTH AT 70% CRUSH (psi) | STRENGTH AT 80% CRUSH (psi) |
|---|---|---|---|---|---|---|---|---|
| 30 | 9.16 | 9.18 | 9.24 | 9.41 | 9.63 | 10.46 | 14.23 | 26.15 |
| 31 | 9.11 | 9.88 | 10.13 | 10.66 | 11.86 | 14.34 | 20.24 | 38.03 |
| 32 | 15.41 | 16.04 | 16.51 | 17.39 | 19.12 | 23.48 | 33.23 | 59.29 |
| 33 | 16.07 | 16.94 | 16.83 | 16.93 | 17.33 | 19.30 | 26.20 | 46.94 |
| 34 | 8.38 | 8.89 | 9.17 | 9.38 | 9.87 | 12.29 | 17.69 | 32.83 |
| 35 | 14.38 | 14.47 | 14.64 | 15.16 | 16.33 | 19.68 | 27.35 | 47.64 |
| 36 | 13.66 | 14.01 | 14.22 | 14.31 | 14.46 | 15.03 | 19.84 | 38.40 |
| 37 | 7.91 | 8.27 | 8.67 | 9.18 | 10.22 | 12.70 | 18.74 | 36.88 |
| 38 | 13.15 | 14.42 | 15.49 | 16.51 | 18.38 | 22.82 | 32.92 | 10.45 |
| 39 | 18.01 | 18.30 | 18.67 | 19.05 | 19.64 | 20.79 | 26.51 | 50.81 |
| 40 | 11.61 | 11.49 | 11.62 | 11.84 | 11.95 | 14.30 | 20.22 | 37.52 |
| 41 | 13.26 | 14.00 | 14.77 | 15.32 | 16.82 | 21.32 | 30.73 | 55.04 |

The results of Samples 30–35 are graphically illustrated in FIG. 4, and the results from Samples 36–41 are depicted in FIG. 4A. As can be seen from the results in the Charts and Figures, rigid polyurethane foam Samples 30–31, 33–37, and 39–40 made with a variety of polyols and lithium acetate exhibit constant compressive strength within ±6 psi at free rise densities from 1.56 to 1.8 and at molded densities from about 1.9 to about 2.2. A comparison between the pitch of each curve also suggests that best results are generally obtained by dissolving lithium acetate in formic acid without employing lithium acetate dissolved in water as shown by Samples 30, 33, 36, and 39. As shown by Samples 31, 34, 37, and 40, dissolving lithium acetate in water without employing formic acid also yielded a foam with constant compressive strengths but generally not quite as constant as foams having lithium acetate dissolved in formic acid. Sample foams 32, 38, and 41 exhibited nearly constant compressive strength, but the combination of a solution of lithium acetate dissolved in formic acid, a solution of lithium acetate dissolved in water, and additional water-produced foams with the poorest compressive strength curves out of Samples 23–34. All foams were suitable for energy absorbing applications.

EXAMPLE 5

The following example compares the effect of formic acid-blown rigid polyurethane foam systems having no lithium salts, solid lithium acetate, and lithium acetate dissolved in formic acid upon the constancy of compressive strengths. The samples were handmixed as in Example 1 using the types and amounts of ingredients shown below in Table V. The samples were poured into quart cups and allowed to free rise.

TABLE V

| | SAMPLE NO. | | | | | | | | |
|---|---|---|---|---|---|---|---|---|---|
| | 42* | 43* | 44* | 45 | 46 | 47 | 48 | 49 | 50 |
| POLYOL A | 60 | 60 | 60 | 60 | 60 | 60 | 60 | 60 | 60 |
| POLYOL H | 40 | 40 | 40 | 40 | 40 | 40 | 40 | 40 | 40 |
| DC-193 | 1.5 | 1.5 | 1.5 | 1.5 | 1.5 | 1.5 | 1.5 | 1.5 | 1.5 |
| POLYCAT 8 | 0.2 | 0.2 | 0.2 | 0.2 | 0.2 | 0.2 | 0.2 | 0.2 | 0.2 |
| LiOAc.2H$_2$O (solid)[a] | — | — | 1.53 | — | — | — | — | — | — |
| LiOAc IN FORMIC ACID[b] | — | — | — | 4.63 | 4.63 | 9.26 | 9.26 | 4.63 | 4.63 |
| FORMIC ACID (96%) | 7.0 | 7.0 | 7.0 | 3.90 | 3.90 | 0.80 | 0.80 | 6.90 | 6.90 |
| BiCat V | — | 0.2 | 0.2 | 0.2 | — | — | 0.2 | 0.2 | — |
| WATER/100 pbw polyol | 0.28 | 0.28 | 0.82 | 0.82 | 0.82 | 1.37 | 1.37 | 0.94 | 0.94 |
| m Moles LiOAc/ 100 pbw polyol | — | — | 15 | 15 | 15 | 30 | 30 | 15 | 15 |
| ISO A | 152 | 152 | 161 | 161 | 161 | 169 | 169 | 180 | 180 |
| INDEX | 105 | 105 | 105 | 105 | 105 | 105 | 105 | 105 | 105 |
| MIX TIME (s) | 7 | 5 | 5 | 5 | 5 | 5 | 5 | 5 | 5 |
| CREAM TIME (s) | <7 | <7 | <7 | <6 | <6 | <6 | <6 | <5 | <5 |
| GEL TIME (s) | 99 | 47 | 40 | 36 | 52 | 51 | 46 | 27 | 41 |
| RISE TIME (s) | 147 | 81 | 80 | 85 | 111 | 104 | 89 | 53 | 116 |
| CUP DENSITY (pcf) | 2.20 | 2.21 | 2.16 | 1.92 | 1.80 | 1.73 | 1.80 | 1.54 | 1.46 |
| CORE DENSITY (pcf) | 2.05 | 1.93 | 1.80 | 1.55 | 1.45 | 1.38 | 1.39 | 1.20 | 1.14 |

[a] ground fine with mortar and pestle
[b] 50 g LiOAc.2H$_2$O in 100 g formic acid (32.3% water including water of hydration)

The samples were cut into 2" wide, 2" thick, and 1" long specimens and tested for their compressive strengths according to the procedure of Example 2. The results reported below are an average of three specimens tested from each sample:

CHART V

| SAMPLE NO. | STRENGTH AT 10% CRUSH (psi) | STRENGTH AT 20% CRUSH (psi) | STRENGTH AT 30% CRUSH (psi) | STRENGTH AT 40% CRUSH (psi) | STRENGTH AT 50% CRUSH (psi) | STRENGTH AT 60% CRUSH (psi) | STRENGTH AT 70% CRUSH (psi) | STRENGTH AT 80% CRUSH (psi) |
|---|---|---|---|---|---|---|---|---|
| 42* | 18.69 | 19.50 | 21.26 | 23.86 | 27.18 | 32.75 | 44.01 | 71.87 |
| 43* | 13.78 | 18.13 | 17.32 | 20.28 | 24.34 | 31.48 | 46.00 | 80.54 |
| 44* | 13.48 | 14.91 | 17.05 | 20.02 | 24.03 | 31.12 | 44.91 | 78.26 |
| 45 | 11.44 | 11.86 | 12.48 | 13.28 | 14.39 | 16.87 | 23.14 | 42.08 |
| 46 | 11.93 | 11.73 | 12.24 | 12.81 | 13.83 | 16.09 | 21.56 | 38.28 |
| 47 | 9.28 | 9.74 | 10.13 | 10.62 | 11.57 | 14.64 | 21.70 | 41.30 |
| 48 | 8.77 | 8.88 | 9.14 | 9.53 | 10.46 | 12.97 | 18.48 | 35.18 |
| 49 | 6.84 | 8.43 | 9.09 | 9.72 | 10.45 | 11.39 | 14.34 | 25.09 |
| 50 | 6.61 | 7.61 | 8.29 | 8.73 | 9.32 | 10.29 | 12.95 | 22.26 |

The test results for comparative Samples 42*–44* are graphically illustrated in FIG. 5 while those of inventive Samples 45–50 are shown in FIG. 5A. As can be seen from the curves, it is the presence of lithium salts, not formic acid, that causes the compressive strength to become constant or nearly constant. Foam Samples 42* and 43* prepared with formic acid and without lithium salts exhibited sharp increases in compressive strengths with increasing deflection for deviations greater than 14 p.s.i. The presence of BiCat V failed to have a positive influence on the pitch of the curve. Adding hand-ground lithium acetate dihydrate to the resin and mixing for five seconds in Sample 44* failed to thoroughly dissolve the lithium acetate; furthermore, it performed as poorly as foams made without lithium acetate having a deviation of greater than 17 p.s.i. at 10% to 60% deflection. However, dissolving lithium acetate in formic acid prior to blending with the resin resulted in a rigid foam exhibiting constant compressive strength through deflections ranging from 10 percent to 60 percent as shown by the curve corresponding to Samples 45 and 46. The remaining samples were prepared to test the effect that differing proportions of lithium acetate and formic acid had on the constancy of compressive strength. The test results obtained from Samples 47 and 48 and Samples 49 and 50 indicated that the differing ratios between lithium acetate and formic acid in the proportions tested do not significantly impact the performances of the foam. However, between these samples tested, higher proportions of formic acid yielded slightly flatter curves than the samples prepared with higher proportions of lithium acetate.

Without being limited to a theory, one of the factors accounting for this difference may be attributable not so much to the ratio between formic acid and lithium acetate as formulated but, perhaps, to the densities of the foam samples. The number of broken struts and foam particles below the crushing head or object increases as the head advances through the foam resulting in an increase in resistance and a greater force necessary to further deflect the foam. Accordingly, the rate of resistance against the head or object approaching 60 percent deflection on a foam with low density will not be as great as the rate of resistance encountered by a head approaching 60 percent deflection on a higher density foam.

EXAMPLE VI

The foams in this example were handmixed by the procedure set forth in Example 1 in the proportion and amounts set forth below in Table VI. The ratio of Polyol A to Polyol H remained constant at 1.5. These compositions reported in the Table VI further set forth alternative formulation to make rigid foams exhibiting compressive strengths varying not more than ±6 psi at deflections from 10 percent to 60 percent and at molded densities less than 2.2 pcf. The handmixed batches were poured into 4"×10"×10" wooden cake boxes, plugged, and allowed to react. The density of each sample is set forth in the table below:

TABLE VI

| | SAMPLE NO. | | | |
|---|---|---|---|---|
| | 51 | 52 | 53 | 54 |
| POLYOL A | 61.2 | 73.8 | 60.6 | 66.6 |
| POLYOL H | 40.8 | 49.2 | 40.4 | 44.4 |
| DC-193 | 1.53 | 1.85 | 1.51 | 1.66 |
| POLYCAT 8 | 0.20 | 0.25 | 0.20 | 0.22 |
| LiOAc.2H$_2$O IN FORMIC ACID (96%)[a] | 4.72 | 5.69 | 4.68 | 3.14 |
| FORMIC ACID (96%) | 3.98 | 4.80 | 0.70 | 7.66 |
| BiCat V | 0.20 | 0.25 | 0.20 | 0.22 |
| WATER/100 pbw POLYOL | 0.82 | 0.82 | 1.37 | 0.94 |
| ISO A | 164 | 170 | 180 | 198 |
| INDEX | 105 | 90 | 105 | 105 |
| MOLDED DENSITY (pcf) | 1.96 | 2.13 | 2.16 | 2.03 |

[a] 50 g LiOAC.2H$_2$O in 100 g 96% Formic Acid (13.43% water)

The same procedure used to test the samples of Example 2 were employed here. The results are reported below in Chart VI as an average of three specimens per sample.

CHART VI

| SAMPLE NO. | STRENGTH AT 10% CRUSH (psi) | STRENGTH AT 20% CRUSH (psi) | STRENGTH AT 30% CRUSH (psi) | STRENGTH AT 40% CRUSH (psi) | STRENGTH AT 50% CRUSH (psi) | STRENGTH AT 60% CRUSH (psi) | STRENGTH AT 70% CRUSH (psi) | STRENGTH AT 80% CRUSH (psi) |
|---|---|---|---|---|---|---|---|---|
| 51 | 15.42 | 15.65 | 16.19 | 16.87 | 17.59 | 18.66 | 21.48 | 39.28 |
| 52 | 14.92 | 15.62 | 16.12 | 17.20 | 18.85 | 21.23 | 26.79 | 45.40 |
| 53 | 13.82 | 14.30 | 14.52 | 15.50 | 15.38 | 16.26 | 19.24 | 38.2 |
| 54 | 18.94 | 20.14 | 21.06 | 21.97 | 23.02 | 24.77 | 27.25 | 44.8 |

As can be seen from FIG. 6, each of the sampled formulations (51, 53, and 54) produced foams having constant compressive strengths and deviations of less than ±6 psi with densities less than 2.2 at various levels of formic acid and isocyanate indices.

What we claim is:

1. A rigid polyurethane foam obtained by reacting a formulation comprising:
   A) an aromatic organic polyisocyanate,
   B) a compound having at least two isocyanate reactive hydrogens,
   C) a reactive blowing agent,
   D) a urethane promoting catalyst,
   E) a surfactant, and
   F) a lithium salt of an organic material having 2 to 30 carbon atoms and at least one carboxylic acid group.

2. The foam of claim 1 wherein the lithium salt comprises lithium acetate.

3. The foam of claim 1, wherein the lithium salt comprises lithium stearate.

4. The foam of claim 1, wherein the amount of lithium salt is from 0.01 to 3.0 parts by weight based on 100 parts by weight of the compound having at least two isocyanate reactive hydrogens.

5. The foam of claim 1, wherein the blowing agent is selected from the group consisting of water, salts of formic acid, formic acid, and mixtures thereof.

6. The foam of claim 5, wherein the blowing agent is a mixture of water and formic acid, the lithium salt comprises lithium acetate, and the amount of water is from about 0.8 to about 1.5 parts by weight based on 100 parts by weight of compound (B).

7. The foam of claim 1, wherein the blowing agent consists of water, the lithium salt comprises lithium acetate, and the amount of water is less than 8.0 parts by weight based on 100 parts by weight polyol.

8. The foam of claim 1, wherein the foam has a molded density less than about 2.8 pounds per cubic foot.

9. The foam of claim 8, wherein the foam has a packed molded density less than about 2.2 pounds per cubic foot.

10. The foam of claim 1, wherein the compound having at least two isocyanate reactive hydrogens has an average hydroxyl functionality of 3 to 8 and a theoretical hydroxyl number from about 300 to about 600.

11. The foam of claim 1, wherein the foam has a nearly constant compression strength from about 10 percent to about 60 percent deflection at loads of less than 60 psi.

12. The foam of claim 11, wherein the foam has a constant compressive strength from about 10 percent to about 60 percent deflection at loads of less than 60 psi.

13. The foam of claim 11, wherein the foam has a molded density of less than 2.3 pounds per cubic foot.

14. The foam of claim 13, wherein the foam has a molded density from about 1.9 to about 2.2 pounds per cubic foot.

15. The foam of claim 1, further comprising physical blowing agents with an ozone depletion potential of 0.2 or less.

16. A completely reactive blown rigid polyurethane foam comprising:
   A) an organic diisocyanate;
   B) a polyoxyalkylene polyether polyol or a polyoxyalkylene polyester polyol, each having an average hydroxyl functionality of from 3 to 8 and a theoretical hydroxyl number of from about 300 to about 700;
   C) a reactive blowing agent comprising water or a mixture of water and formic acid, wherein the amount of total water in the formulation ranges from 0.1 to 7.5 parts by weight based on 100 parts by weight of polyol;
   D) a surfactant, a urethane promoting catalyst; and
   E) a lithium salt of an organic material having 2 to 30 carbon atoms and at least one carboxylic acid group.

17. The foam of claim 16, wherein the lithium salt is lithium acetate and/or lithium stearate in an amount ranging from 0.05 to 3.0 parts by weight based on 100 parts by weight of polyol, the foam having a molded density of less than 2.3 pounds per cubic foot.

18. A rigid polyurethane foam obtained by reacting a formulation comprising:
   A) an aromatic organic polyisocyanate,
   B) a compound having at least two isocyanate reactive hydrogens,
   C) from 0.1 to 8 parts by weight of a reactive blowing agent based on 100 parts by weight of polyol,
   D) a urethane promoting catalyst,
   E) a surfactant, and
   F) a lithium salt of an organic material having 2 to 30 carbon atoms and at least one carboxylic acid group,
said foam having a molded density of 2.8 pcf or less and a nearly constant compressive strength at deflections ranging from 10 percent to 60 percent at loadings less than 60 psi.

19. The foam of claim 18, wherein the rigid foam is completely reactive blown, the reactive blowing agent selected from the group consisting of water, formic acid, a mixture of water and a salt of formic acid, and mixtures thereof, the amount of water present being 7.0 parts by weight or less.

20. The foam of claim 19, wherein the reactive blowing agent consists of water present in an amount from about 4.5 to about 7.0 parts by weight, said lithium salt being lithium acetate, and said foam having a constant compressive strength at deflections from 10 percent to 6 percent at loadings of less than 60 psi.

21. The foam of claim 19, wherein the blowing agent comprises a mixture of water and formic acid, the amount of water present being from 0.1 to 1.5 parts by weight based on 100 parts by weight of polyol, and the lithium salt being lithium acetate.

22. The foam of claim 21, wherein the foam has a molded density of less than 2.3 pcf and exhibits a constant compressive strength at deflections from 10 percent to 60 percent at loadings of less than 60 psi.

23. A rigid polyurethane foam having a nearly constant compressive strength at deflections ranging from 10 percent to 60 percent obtained by reacting a formulation comprising:
   A) an organic polyisocyanate,
   B) a compound having at least two isocyanate reactive hydrogens,
   C) a blowing agent selected from the group consisting of chlorofluorocarbons having at least one hydrogen and an ozone depletion potential of less than 0.2, volatile hydrocarbons, volatile fluorinated organic compounds, water, a mixture of water and formic acid, and mixtures thereof,
   D) a urethane promoting catalyst, and,
   E) a lithium salt of an organic material having 2 to 30 carbon atoms and at least one carboxylic acid group.

24. The foam of claim 23, wherein the formulation further comprises a surfactant.

25. The foam of claim 24, wherein the lithium salt comprises lithium acetate or lithium stearate.

26. The foam of claim 25, wherein the foam has a molded density from between 1.5 pounds per cubic foot to 2.2 pounds per cubic foot.

* * * * *